US012341280B2

(12) United States Patent
Jun et al.

(10) Patent No.: US 12,341,280 B2
(45) Date of Patent: Jun. 24, 2025

(54) ELECTRONIC DEVICE INCLUDING CABLE CONNECTOR

(71) Applicant: SAMSUNG ELECTRONICS CO., LTD., Suwon-si (KR)

(72) Inventors: Yunjae Jun, Suwon-si (KR); Myunghyo Bae, Suwon-si (KR); Soogyu Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 364 days.

(21) Appl. No.: 17/876,435

(22) Filed: Jul. 28, 2022

(65) Prior Publication Data

US 2023/0013100 A1 Jan. 19, 2023

Related U.S. Application Data

(63) Continuation of application No. PCT/KR2022/010275, filed on Jul. 14, 2022.

(30) Foreign Application Priority Data

Jul. 14, 2021 (KR) ........................ 10-2021-0092349

(51) Int. Cl.
*H01R 12/52* (2011.01)
*H01R 12/71* (2011.01)
(Continued)

(52) U.S. Cl.
CPC ........... *H01R 12/79* (2013.01); *H01R 12/716* (2013.01); *H01R 12/774* (2013.01); *H01R 13/639* (2013.01)

(58) Field of Classification Search
CPC .... H01R 12/79; H01R 12/716; H01R 12/774; H01R 13/639; H01R 4/489; H01R 13/58;
(Continued)

(56) References Cited

U.S. PATENT DOCUMENTS 6,712,645 B1 * 3/2004 Chou .................. H01R 9/0518
439/582
7,874,870 B1 * 1/2011 Chen ..................... H01R 24/40
439/582
(Continued)

FOREIGN PATENT DOCUMENTS

JP    2004-207077    7/2004
JP    2007-122916    5/2007
(Continued)

OTHER PUBLICATIONS

Search Report and Written Opinion dated Oct. 28, 2022 issued in International Patent Application No. PCT/KR2022/010275.
(Continued)

*Primary Examiner* — Abdullah A Riyami
*Assistant Examiner* — Nelson R. Burgos-Guntin
(74) *Attorney, Agent, or Firm* — Nixon & Vanderhye P.C.

(57) ABSTRACT

Provided is an electronic device including a cable connector. The electronic device including a cable connector according to various embodiments of the disclosure may include: a cable including a connector part comprising a connector connected to one end part of the cable and configured to deliver an electrical signal, and a cable coupling part comprising a coupler including an opening and an internal surface configured to have the connector part of the cable inserted therein and combined therewith, the cable coupling part being electrically connected to the connector part. The connector part may include a hook part comprising a hook configured to snap and combine the connector part with the cable coupling part by being elastically deformed based on the connector part being inserted into the cable coupling part, and a contact part comprising a contact separated from the hook part and configured to form an electrical contact with the cable coupling part by pressurizing at least a part of the internal surface of the cable coupling part by its elastic
(Continued)

force by being elastically deformed independently of the hook part based on the connector part being combined with the cable coupling part. In various embodiments, the hook part may be extended from the connector part and bent and formed in a direction opposite to a direction in which the connector part is combined with the cable coupling part. An angle of the bending may be set so that the hook part has an overlap with the internal surface of the cable coupling part, so that the hook part may elastically pressurize the internal surface of the cable coupling part.

20 Claims, 23 Drawing Sheets

(51) Int. Cl.
  *H01R 12/77*   (2011.01)
  *H01R 12/79*   (2011.01)
  *H01R 13/639*   (2006.01)
(58) Field of Classification Search
  CPC . H01R 13/2407; H01Q 1/243; H04M 1/0274; H04M 1/026
  See application file for complete search history.

(56) References Cited

U.S. PATENT DOCUMENTS

| | | | |
|---|---|---|---|
| 8,147,263 B2* | 4/2012 | Matsushima | H05K 5/0226 439/31 |
| 10,206,299 B2 | 2/2019 | Kim et al. | |
| 11,362,452 B2 | 6/2022 | Lee et al. | |
| 2006/0189197 A1 | 8/2006 | Reed et al. | |
| 2009/0270135 A1* | 10/2009 | Shoji | H04M 1/18 455/566 |
| 2010/0246120 A1* | 9/2010 | Yada | G06F 1/1613 361/679.56 |
| 2014/0043192 A1 | 2/2014 | Park et al. | |
| 2014/0153211 A1* | 6/2014 | Malek | H01Q 1/38 264/447 |
| 2014/0295697 A1* | 10/2014 | Niitsu | H05K 3/365 439/492 |
| 2015/0200479 A1 | 7/2015 | Rhee | |
| 2015/0230348 A1 | 8/2015 | Yoon | |
| 2015/0311605 A1* | 10/2015 | Moore | H01R 9/0515 439/84 |
| 2017/0290184 A1* | 10/2017 | Kim | H05K 1/14 |
| 2018/0166809 A1* | 6/2018 | Brogan | H01R 13/2407 |
| 2019/0094920 A1* | 3/2019 | Qiu | H04N 23/57 |
| 2021/0184337 A1 | 6/2021 | Lee et al. | |
| 2022/0171428 A1* | 6/2022 | Park | G06F 1/1607 |

FOREIGN PATENT DOCUMENTS

| | | |
|---|---|---|
| JP | 6770241 | 10/2020 |
| KR | 10-2006-0062439 | 6/2006 |
| KR | 10-2012-0017097 | 2/2012 |
| KR | 10-2015-0084106 | 7/2015 |
| KR | 10-2017-0068953 | 6/2017 |
| KR | 10-2018-0111153 | 10/2018 |
| KR | 10-1967392 | 4/2019 |
| KR | 10-2020-0001221 | 1/2020 |
| KR | 10-2165182 | 10/2020 |
| KR | 10-2394255 | 5/2022 |

OTHER PUBLICATIONS

Extended European Search Report dated Sep. 18, 2024 for EP Application No. 22842479.2.

* cited by examiner

ELECTRONIC DEVICE INCLUDING CABLE CONNECTOR

CROSS-REFERENCE TO RELATED APPLICATIONS

This application is a continuation of International Application No. PCT/KR2022/010275 designating the United States, filed on Jul. 14, 2022, in the Korean Intellectual Property Receiving Office and claiming priority to Korean Patent Application No. 10-2021-0092349, filed on Jul. 14, 2021, in the Korean Intellectual Property Office, the disclosures of which are incorporated by reference herein in their entireties.

BACKGROUND

Field

The disclosure relates to an electronic device and, for example, to an electronic device including a cable connector.

Description of Related Art

An electronic device may include a wireless antenna for emitting electromagnetic waves to the outside or receiving external electromagnetic waves for wireless communication network or wireless LAN communication. The wireless antenna may protrude to the outside of the electronic device or may be embedded in the electronic device in order to improve an external appearance and the portability of the electronic device. Recently, in order to improve the portability of an electronic device, a housing design scheme of the electronic device including a metal material composed to play a role as an antenna is generalized.

The antenna of the electronic device may include an RF transmission/reception circuit along with a passive element, such as a capacitor, a coil, or a resistor, and an active element, such as a diode, a transistor, and an RFIC. The active and passive elements of the electronic device are interconnected on a PCB of the electronic device. The antenna is connected to the PCB through a cable.

If a fastening member such as a bolt is used when a cable is connected to an antenna, transmission and reception performance of the antenna may be degraded due to irregular contact resistance of a connector part if the connector part of the cable is not accurately installed and inserted into the bolt. Accordingly, in order to inspect whether the cable is accurately installed and inserted, inspection by the naked eye of a worker is necessary. Upon failure of installation and insertion, a complicated process of dissembling and re-fastening a fastening member may be necessary.

SUMMARY

Embodiments of the disclosure may provide an electronic device including a cable connector part which can stably maintain an electrical contact and which is assembled and dissembled by a simple process.

An electronic device according to various example embodiments of the disclosure may include: a cable including a connector part comprising a connector configured to be connected to one end part of the cable and to deliver an electrical signal, and a cable coupling part comprising a coupler including an opening and an internal surface configured to have the connector part of the cable inserted therein and combined therewith, the cable coupling part being electrically connected to the connector part. The connector part may include a hook part comprising a hook configured to snap and combine the connector part with the cable coupling part by being elastically deformed based on the connector part being inserted into the cable coupling part, and a contact part comprising a contact separated from the hook part and configured to form an electrical contact with the cable coupling part by pressurizing at least a part of the internal surface of the cable coupling part by its elastic force by being elastically deformed independently of the hook part based on the connector part being combined with the cable coupling part. In various embodiments, the hook part may be extended from the connector part and bent and formed in a direction opposite to a direction in which the connector part is combined with the cable coupling part. An angle of the bending may be set so that the hook part overlaps the internal surface of the cable coupling part, so that the hook part may elastically pressurize the internal surface of the cable coupling part.

In various embodiments, an end part of the hook part may be subjected to hemming processing. In an embodiment, a break part of the hook part may have a dual bending structure bent in a direction identical with the bent direction.

In various embodiments, the cable coupling part may include a conduction part comprising a conductor formed on an area corresponding to the contact part of the internal surface. The contact part may be extended from the connector part and bent and formed in a direction opposite to a direction in which the connector part is inserted into the cable coupling part. An angle of the bending may be set so that the contact part overlaps a surface of the conduction part of the cable coupling part, so that the contact part can elastically pressurize the internal surface of the cable coupling part. In an embodiment, the contact part may include a contact tip having a curved form protruding on a surface facing the conduction part. In an embodiment, the connector part may include an assistant contact part formed on a surface in the direction in which the connector part is inserted into the cable coupling part. The cable coupling part may include an assistant conduction part formed in an area on the internal surface corresponding to the assistant contact part.

In various embodiments, the assistant contact part may include an assistant contact tip having a curved form and protruding on a surface of the connector part facing the assistant conduction part. In an embodiment, the assistant contact part may include an elastic assistant contact tip formed in a way to bend, in a direction toward the assistant conduction part, a surface of the connector part facing the assistant conduction part by cutting away or punching the surface of the connector part in a U form.

In various embodiments, the cable coupling part may include a trapping jaw protruding on an area corresponding to the hook part in a circumference of the opening. In an embodiment, the cable coupling part may include a bottom surface which is an internal surface facing the direction in which the connector part is inserted into the cable coupling part. The cable coupling part may include a separation groove formed as some area of an edge of the bottom surface is depressed and disposed to be partially covered by the connector part based on the connector part being combined with the cable coupling part.

A cable connector of an electronic device according an embodiment of the disclosure is a cable connector of an electronic device including a cable and a cable coupling part having an internal surface electrically connected to the cable. The cable connector may include a hook part configured to snap and combine the connector part with the cable coupling part by being elastically deformed based on the connector part being inserted into the cable coupling part, and a contact part separated from the hook part and configured to form an electrical contact with the cable coupling part by pressurizing the internal surface of the cable coupling part by its elastic force by being elastically deformed independently of the hook part based on the connector part being combined with the cable coupling part. In various embodiments, the hook part is extended from the connector part and bent and formed in a direction opposite to a direction in which the connector part is combined with the cable coupling part. An angle of the bending may be set so that the hook part has an overlap with the internal surface of the cable coupling part, so that the hook part can elastically pressurize the internal surface of the cable coupling part.

In various embodiments, an end part of the hook part may be subjected to hemming processing. In an embodiment, a break part of the hook part may have a dual bending structure bent in a direction identical with the bent direction.

In various embodiments, the cable coupling part of the electronic device may include a conduction part formed on an area corresponding to the contact part of the internal surface. The contact part may be extended from the connector part and bent and formed in a direction opposite to a direction in which the connector part is inserted into the cable coupling part, and an angle of the bending may be set so that the contact part has an overlap with a surface of the conduction part of the cable coupling part, whereby the contact part can elastically pressurize the internal surface of the cable coupling part. In an embodiment, the contact part may include a contact tip having a curved form protruding on a surface facing the conduction part. In an embodiment, the connector part may include an assistant contact part formed on a surface in the direction in which the connector part is inserted into the cable coupling part. The cable coupling part may include an assistant conduction part formed in an area on the internal surface corresponding to the assistant contact part.

In various embodiments, the assistant contact part may include an assistant contact tip having a curved form and protruding on a surface of the connector part facing the assistant conduction part. In an embodiment, the assistant contact part may include an elastic assistant contact tip formed in a way to bend, in a direction toward the assistant conduction part, a surface of the connector part facing the assistant conduction part by cutting away or punching the surface of the connector part in a U form.

According to various example embodiments of the disclosure, the hook part is snapped and combined with the cable coupling part, and the contact part is separated from the hook part and forms an electrical contact with the cable coupling part by an elastic force independently of the hook part. Accordingly, the cable connector part whose electrical contact is stably maintained and assembly process is simplified can be provided.

BRIEF DESCRIPTION OF THE DRAWINGS

In relation to the description of the drawings, the same or similar reference numerals may be used with respect to the same or similar elements. Further, the above and other aspects, features and advantages of certain embodiments of the present disclosure will be more apparent from the following detailed description, taken in conjunction with the accompanying drawings, in which.

DETAILED DESCRIPTION

Figure 1:
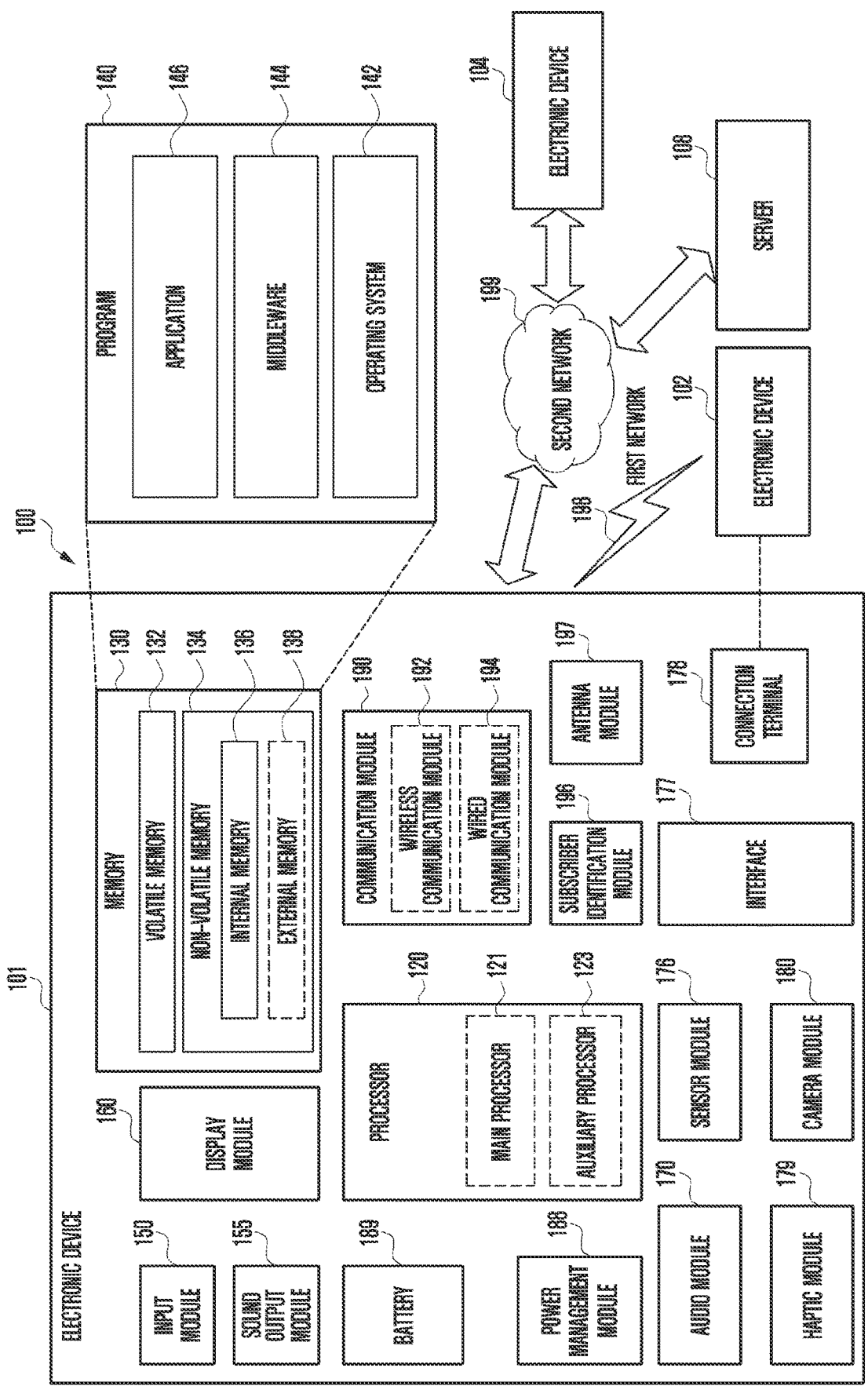
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
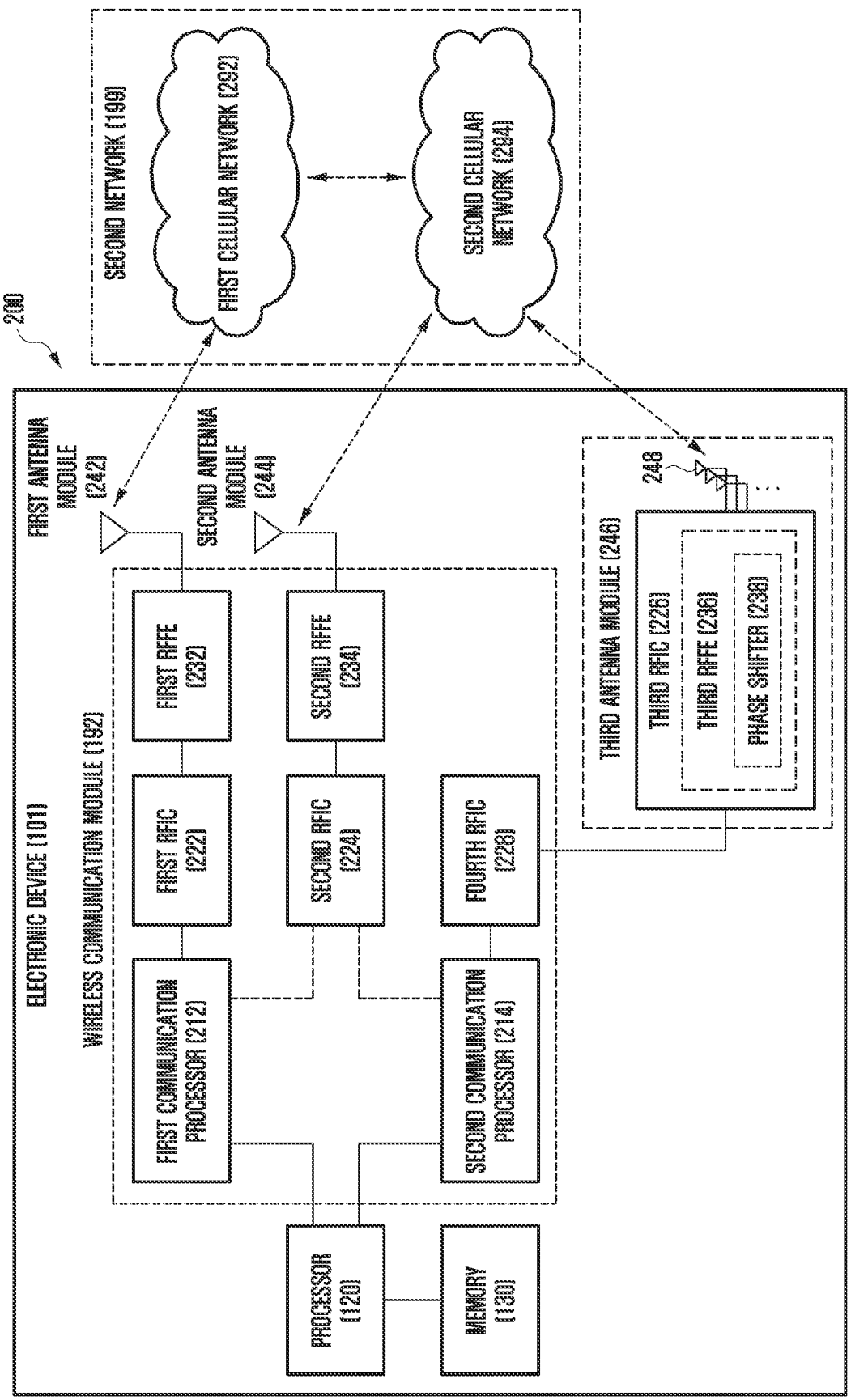
FIG. 2 is a block diagram illustrating an example configuration of the electronic device for supporting legacy network communication and 5G network communication according to various embodiments.

FIG. 2 is a block diagram 200 illustrating an example configuration of the electronic device 101 for supporting legacy network communication and 5G network communication according to various embodiments.

With reference to FIG. 2, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor (e.g., including processing circuitry) 120 and the memory 130. The network 199 may include a first network 292 and a second network 294. According to an embodiment, the electronic device 101 may further include at least one of the parts illustrated in FIG. 1. The network 199 may further include at least another network. According to an embodiment, the first communication processor 212, the second communication processor 214, the first RFIC 222, the second RFIC 224, the fourth RFIC 228, the first RFFE 232, and the second RFFE 234 may form at least a part of the wireless communication module 192. According to an embodiment, the fourth RFIC 228 may be omitted or may be included as a part of the third RFIC 226.

The first communication processor 212 may include various processing circuitry and support the establishment of a communication channel of a band to be used for wireless communication with the first network 292 and legacy network communication through the established communication channel. According to various embodiments, the first network may be a legacy network including a $2^{nd}$ generation (2G), 3G, 4G, or long term evolution (LTE) network. The second communication processor 214 may include various communication circuitry and support the establishment of a communication channel corresponding to a designated band (e.g., about 6 GHz to about 60 GHz) among bands to be used for wireless communication with the second network 294, and 5G network communication through the established communication channel. According to various embodiments, the second network 294 may be a 5G network defined in 3GPP. Additionally, according to an embodiment, the first communication processor 212 or the second communication processor 214 may support the establishment of a communication channel corresponding to another designated band (e.g., about 6 GHz or less) among bands to be used for wireless communication with the second network 294, and 5G network communication through the established communication channel. According to an embodiment, the first communication processor 212 and the second communication processor 214 may be implemented within a single chip or a single package. According to various embodiments, the first communication processor 212 or the second communication processor 214 may be formed within a single chip or a single package along with the processor 120, the auxiliary processor 123, or the communication module 190.

Upon transmission, the first RFIC 222 may convert a baseband signal, generated by the first communication processor 212, into a radio frequency (RF) signal of about 700 MHz to about 3 GHz used in the first network 292 (e.g., a legacy network). Upon reception, an RF signal may be obtained from the first network 292 (e.g., a legacy network) through an antenna (e.g., the first antenna module 242), and may be processed through an RFFE (e.g., the first RFFE 232). The first RFIC 222 may convert a pre-processed RF signal into a baseband signal so that the pre-processed RF signal can be processed by the first communication processor 212.

Upon transmission, the second RFIC 224 may convert a baseband signal, generated by the first communication processor 212 or the second communication processor 214, into an RF signal having a Sub6 band (e.g., about 6 GHz or less) (hereinafter a 5G Sub6 RF signal) used in the second network 294 (e.g., a 5G network). Upon reception, a 5G Sub6 RF signal may be obtained from the second network 294 (e.g., a 5G network) through an antenna (e.g., the second antenna module 244), and may be processed through an RFFE (e.g., the second RFFE 234). The second RFIC 224 may convert a pre-processed 5G Sub6 RF signal into a baseband signal so that the pre-processed 5G Sub6 RF signal can be processed by a corresponding communication processor of the first communication processor 212 or the second communication processor 214.

The third RFIC 226 may convert a baseband signal, generated by the second communication processor 214, into an RF signal (hereinafter the 5G Above6 RF signal) having a 5G Above6 band (e.g., about 6 GHz to about 60 GHz) to be used in the second network 294 (e.g., a 5G network). Upon reception, a 5G Above6 RF signal may be obtained from the second network 294 (e.g., a 5G network) through an antenna (e.g., the antenna 248), and may be processed through the third RFFE 236. The third RFIC 226 may convert a pre-processed 5G Above6 RF signal into a baseband signal so that the pre-processed 5G Above6 RF signal can be processed by the second communication processor 214. According to an embodiment, the third RFFE 236 may be formed as a part of the third RFIC 226.

According to an embodiment, the electronic device 101 may include the fourth RFIC 228 separately from or as at least a part of the third RFIC 226. In such a case, the fourth RFIC 228 may convert a baseband signal, generated by the second communication processor 214, into an RF signal having an intermediate frequency band (e.g., about 9 GHz to about 11 GHz) (hereinafter an IF signal), and may deliver the IF signal to the third RFIC 226. The third RFIC 226 may convert the IF signal into a 5G Above6 RF signal. Upon reception, a 5G Above6 RF signal may be received from the second network 294 (e.g., a 5G network) through an antenna (e.g., the antenna 248), and may be converted into an IF signal by the third RFIC 226. The fourth RFIC 228 may convert an IF signal into a baseband signal so that the second communication processor 214 can process the IF signal.

According to an embodiment, the first RFIC 222 and the second RFIC 224 may be implemented as at least a part of a single chip or a single package. According to an embodiment, the first RFFE 232 and the second RFFE 234 may be implemented as at least a part of a single chip or a single package. According to an embodiment, at least one of the first antenna module 242 or the second antenna module 244 may be omitted or may be combined with another antenna module and may process corresponding RF signals having a plurality of bands.

According to an embodiment, the third RFIC 226 and the antenna 248 may be disposed in the same substrate, and may form the third antenna module 246. For example, the wireless communication module 192 or the processor 120 may be disposed in a first substrate (e.g., a main PCB). In such a case, the third RFIC 226 may be disposed in some area (e.g., a bottom surface) of a second substrate (e.g., a sub-PCB) separated from the first substrate and the antenna 248 may be disposed in other some area (e.g., a top surface) of the second substrate, so that the third antenna module 246 may be formed. Since the third RFIC 226 and the antenna 248 are disposed in the same substrate, the length of a transmission line between the third RFIC 226 and the antenna 248 can be reduced. In this case, a loss (e.g., attenuation) of a signal having a high frequency band (e.g., about 6 GHz to about 60 GHz) used for 5G network communication, for example, due to the transmission line can be reduced. Accordingly, the electronic device 101 can improve quality or speed of communication with the second network 294 (e.g., a 5G network).

According to an embodiment, the antenna 248 may be formed as an antenna array including a plurality of antenna elements which may be used for beamforming. In such a case, the third RFIC 226 may include a plurality of phase shifters 238 corresponding to the plurality of antenna elements as a part of the third RFFE 236, for example. Upon transmission, each of the plurality of phase shifters 238 may convert the phase of a 5G Above6 RF signal to be transmitted to the outside (e.g., a base station of a 5G network) of the electronic device 101 through a corresponding antenna element. Upon reception, each of the plurality of phase shifters 238 may convert the phase of a 5G Above6 RF signal, received from the outside, into the same or substantially the same phase through a corresponding antenna element. This enables transmission or reception through beamforming between the electronic device 101 and the outside.

The second network 294 (e.g., a 5G network) may be operated (e.g., stand-alone (SA)) independently of the first network 292 (e.g., a legacy network), or the second network 294 and the first network 292 may be connected and operated (e.g., non-stand alone (NSA)). For example, a 5G network may include only an access network (e.g., a 5G radio access network (RAN) or a next generation RAN (NG RAN)), and may not include a core network (e.g., a next generation core (NGC)). In such a case, after accessing the access network of the 5G network, the electronic device 101 may access an external network (e.g., the Internet) under the control of the core network (e.g., an evolved packed core (EPC)) of a legacy network. Protocol information (e.g., LTE protocol information) for legacy network communication or protocol information (e.g., new radio (NR) protocol information) for 5G network communication may be stored in the memory 230, and may be accessed by another part (e.g., the processor 120, the first communication processor 212, or the second communication processor 214).

Figure 3A:
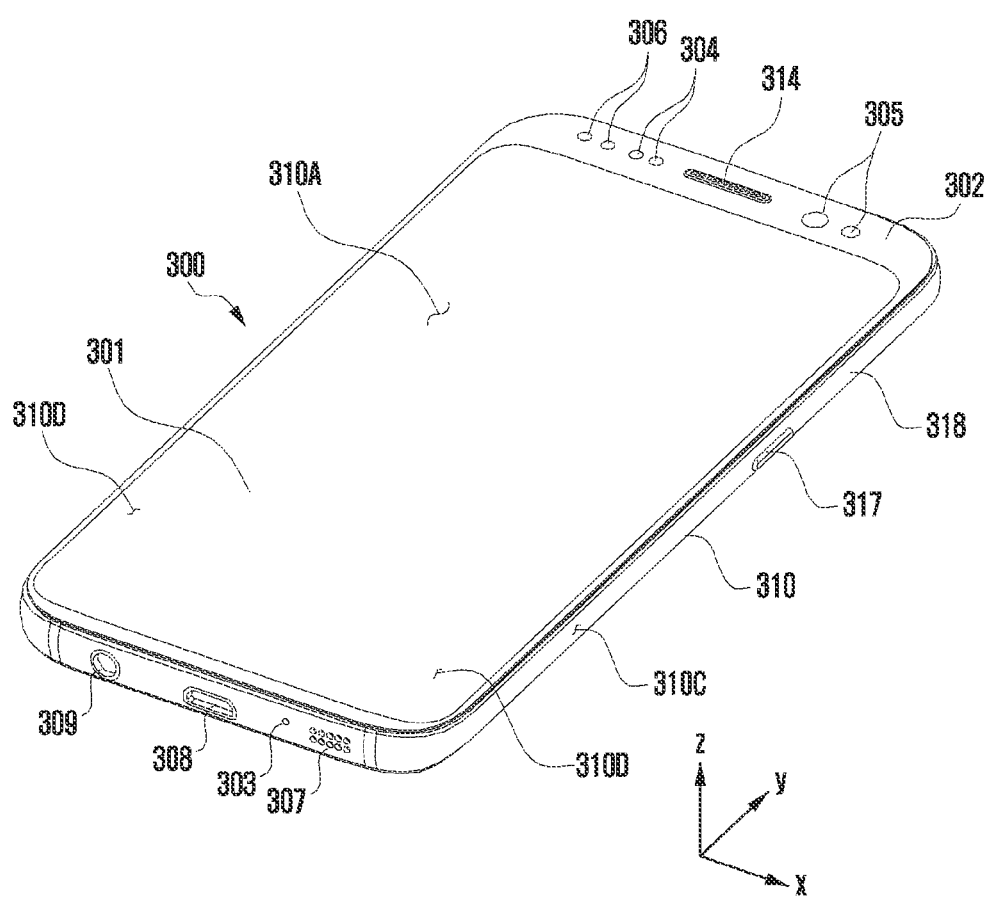
FIG. 3A is a front perspective view of an electronic device according to various embodiments.
Figure 3B:
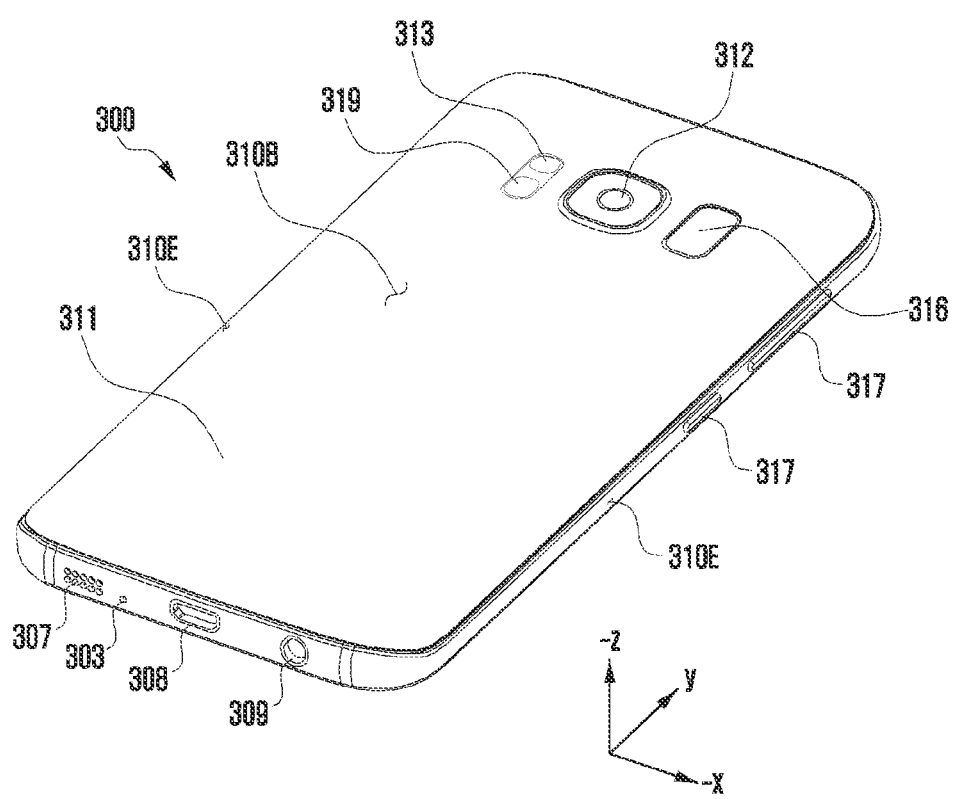
FIG. 3B is a rear perspective view of the electronic device according to various embodiments.

FIG. 3A is a front perspective view of an electronic device 300 according to various embodiments. FIG. 3B is a rear perspective view of the electronic device 300 according to various embodiments.

With reference to FIGS. 3A and 3B, the electronic device 300 (e.g., the electronic device 1 in FIG. 101) according to various embodiments may include a housing 310 including a first surface (or a front surface) 310A, a second surface (or a back surface) 310B, and a side surface 310C surrounding a space (or an internal space) between the first surface 310A and the second surface 310B. In an embodiment (not illustrated), the housing may denote a structure forming a part of the first surface 310A, the second surface 310B, and the side surface 310C. According to an embodiment, at least a part of the first surface 310A may be formed by a front surface plate 302 (e.g., a glass plate or polymer plate including various coating layers) which is substantially transparent. The second surface 310B may be formed by a back surface plate 311 which is substantially opaque. The back surface plate 311 may be formed by coated or colored glass, ceramic, polymer, metal (e.g., aluminum, stainless steel (STS), or magnesium), for example, or a combination of at least two of the aforementioned materials. The side surface 310C may be combined with the front surface plate 302 and the back surface plate 311, and may be formed by a side surface bezel structure (or a "side surface member") 318 including metal and/or polymer. In an embodiment, the back surface plate 311 and the side surface bezel structure 318 may be integratedly formed and may include the same material (e.g., a metal material such as aluminum).

In the illustrated embodiment, the front surface plate 302 may include two first areas 310D, bent and seamlessly extended from the first surface 310A to the back surface plate 311, at both long edges of the front surface plate 302. In the illustrated embodiment (refer to FIG. 3B), the back surface plate 311 may include two second areas 310E, bent and seamlessly extended from the second surface 310B to the front surface plate 302, at both long edges thereof. In an embodiment, the front surface plate 302 (or the back surface plate 311) may include only one of the first areas 310D (or the second areas 310E). In an embodiment, the front surface plate 302 (or the back surface plate 311) may not include some of the first areas 310D (or the second areas 310E). In an embodiment, when viewed from a side surface of the electronic device 300, the side surface bezel structure 318 may have a first thickness (or width) on the side surface side not including the first area 310D or the second area 310E, and may have a second thickness thinner than the first thickness on the side surface including the first area 310D or the second area 310E. In an embodiment, the first area 310D or the second area 310E may be formed as a plane in a way to form substantially one plane along with the first surface 310A or the second surface 310B without being bent.

According to an embodiment, the electronic device 300 may include at least one of a display 301, an audio module 303, 307, and 314, a sensor module 304, 316, and 319, a camera module 305, 312, and 313, a key input device 317, a light-emitting element 306, and a connector hole 308 and 309. In an embodiment, the electronic device 300 may omit at least one (e.g., the key input device 317 or the light-emitting element 306) of the elements or may additionally include another element.

The display 301 may be visually exposed (e.g., visible) through a substantial part of the front surface plate 302, for example. In an embodiment, at least a part of the display 301 may be visually exposed (e.g., visible) through the first surface 310A, and the front surface plate 302 forming the first area 310D of the side surface 310C. In an embodiment, an edge of the display 301 may be formed generally identically with a neighboring outskirt shape of the front surface plate 302. In an embodiment (not illustrated), in order to expand the area where the display 301 is visible, an interval between the outskirt of the display 301 and the outskirt of the front surface plate 302 may be formed generally identically.

In an embodiment (not illustrated), at least one of the audio module 314, the sensor module 304, the camera module 305, and the light-emitting element 306 which forms a recess or an opening and is aligned with the recess or the opening may be formed in a part of a screen display area of the display 301. In an embodiment (not illustrated), at least one of the audio module 314, the sensor module 304, the camera module 305, a fingerprint sensor 316, and the light-emitting element 306 may be included in a back surface of the screen display area of the display 301. In an embodiment (not illustrated), the display 301 may be combined with a touch detection circuit, a pressure sensor capable of measuring the intensity (pressure) of a touch and/or a digitizer for detecting a stylus pen using a magnetic field method or may be disposed to be adjacent thereto. In an embodiment, at least a part of the sensor module 304 and 319 and/or at least a part of the key input device 317 may be disposed in the first area 310D and/or the second area 310E.

The audio module 303, 307, and 314 may include a microphone hole 303 and a speaker hole 307 and 314. A microphone for obtaining an external sound may be disposed within the microphone hole 303. In an embodiment, a plurality of microphones may be disposed within the microphone hole 303 in a way to detect a direction of a sound. The speaker hole 307 and 314 may include an external speaker hole 307 and a receiver hole 314 for a call. In an embodiment, the speaker hole 307 and 314 and the microphone hole 303 may be implemented as one hole or a speaker (e.g., a piezo speaker) may be included without the speaker hole 307 and 314.

The sensor module 304, 316, and 319 may generate an electrical signal or a data value corresponding to an internal operating state of the electronic device 300 or an external environment state. The sensor module 304, 316, and 319 may include a first sensor module 304 (e.g., a proximity sensor) disposed in the first surface 310A of the housing 310 and/or a second sensor module (not illustrated) (e.g., a fingerprint sensor) and/or a third sensor module 319 (e.g., an HRM sensor) disposed in the second surface 310B of the housing 310 and/or the fourth sensor module 316 (e.g., the fingerprint sensor), for example. The fingerprint sensor may be disposed in the second surface 310B in addition to the first surface 310A (e.g., the display 301) of the housing 310. The electronic device 300 may further include a sensor module not illustrated, for example, at least one of a gesture sensor, a gyro sensor, an atmospheric sensor, a magnetic sensor, an acceleration sensor, a grip sensor, a color sensor, an infrared (IR) sensor, a bio sensor, a temperature sensor, a humidity sensor, or an illuminance sensor 304.

The camera module 305, 312, and 313 may include a first camera device 305 disposed in the first surface 310A of the electronic device 300 and a second camera device 312 and/or a flash 313 disposed in the second surface 310B. The camera module 305 and 312 may include one or a plurality of lenses, image sensors and/or image signal processors. The flash 313 may include a light-emitting diode or a xenon lamp, for example. In an embodiment, two or more lenses (an infrared camera, a wide angle lens and a telephoto lens) and image sensors may be disposed in one surface of the electronic device 300.

The key input device 317 may be disposed in the side surface 310C of the housing 310. In an embodiment, the electronic device 300 may not include some or all of the key input devices 317. A key input device 317 not included in the electronic device 300 may be implemented on the display 301 in the form of a soft key. In an embodiment, the key input device 317 may include the sensor module 316 disposed in the second surface 310B of the housing 310.

The light-emitting element 306 may be disposed in the first surface 310A of the housing 310, for example. The light-emitting element 306 may provide state information of the electronic device 300 in a light form, for example. In an embodiment, the light-emitting element 306 may provide a light source operating in conjunction with an operation of the camera module 305, for example. The light-emitting element 306 may include an LED, an IR LED, and a xenon lamp, for example.

The connector hole 308 and 309 may include a first connector hole 308 capable of accommodating a connector (e.g., a USB connector) for transmitting and receiving power and/or data to and from an external electronic device and/or a second connector hole (e.g., an earphone jack) 309 capable of accommodating a connector for transmitting and receiving audio signals to and from an external electronic device.

Figure 3C:
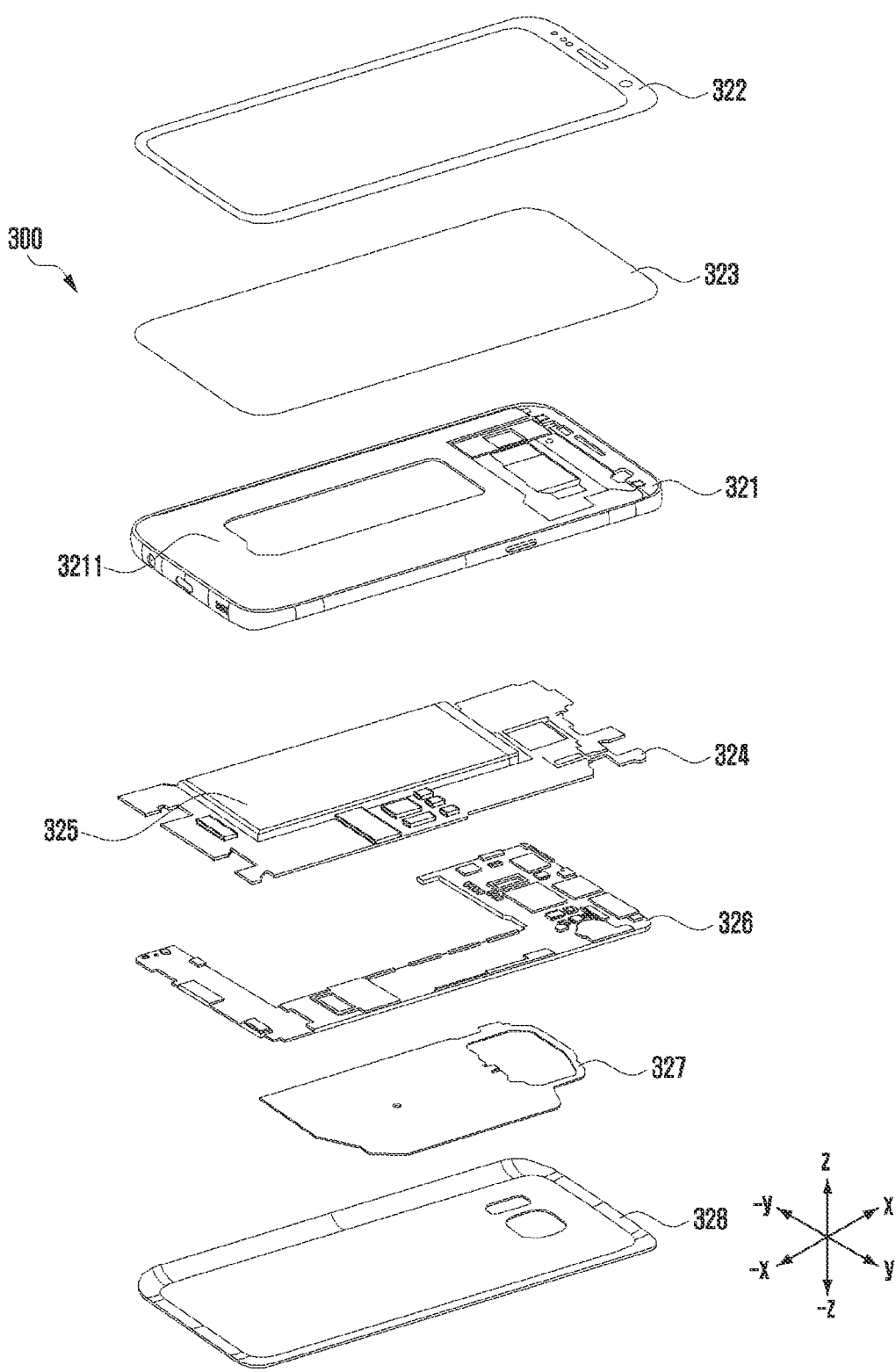
FIG. 3C is an exploded perspective view of the electronic device according to various embodiments.

FIG. 3C is an exploded perspective view of the electronic device 300 according to various embodiments.

With reference to FIG. 3C, the electronic device 300 may include a side surface bezel structure 321, a first support member 3211 (e.g., a bracket), a front surface plate 322, a display 323, a printed circuit board 324, a battery 325, a second support member 326 (e.g., a rear case), an antenna 327, and a back surface plate 328. In an embodiment, the electronic device 300 may omit at least one (e.g., the first support member 3211, or the second support member 326) of the elements or may additionally include another element. At least one of the elements of the electronic device 300 may be identical with or similar to at least one of the elements of the electronic device 300 in FIG. 3A or 3B, and a redundant description thereof may not be repeated.

The first support member 3211 may be disposed within the electronic device 300 and connected to the side surface bezel structure 321 or may be integratedly formed with the side surface bezel structure 321. The first support member 3211 may be for using a metal material and/or a non-metal (e.g., polymer) material, for example. The first support member 3211 may have one surface combined with the display 323, and may have the other surface combined with the printed circuit board 324. A processor (e.g., the processor 120 in FIG. 1), a memory (e.g., the memory 130 in FIG. 1) and/or an interface (e.g., the interface 177 in FIG. 1) may be mounted on the printed circuit board 324. The processor may include one or more of a central processing unit, an application processor, a graphic processor, an image signal processor, a sensor hub processor, or a communication processor, for example.

The memory may include a volatile memory (e.g., the volatile memory 132 in FIG. 1) or a nonvolatile memory (e.g., the nonvolatile memory 134 in FIG. 1), for example.

The interface may include a high definition multimedia interface (HDMI), a universal serial bus (USB) interface, an SD card interface and/or an audio interface, for example. The interface may electrically or physically connect the electronic device 300 to an external electronic device, for example, and may include a USB connector, an SD card/MMC connector, or an audio connector.

The battery 325 is a device for supplying power to at least one element of the electronic device 300, and may include a primary cell incapable of recharging, a rechargeable secondary cell, or a fuel cell, for example. At least a part of the battery 325 may be disposed substantially on the same plane as the printed circuit board 324, for example. The battery 325 may be integratedly disposed within the electronic device 300, and may be disposed in a way to be detachable from the electronic device 300.

The antenna 327 may be disposed the back surface plate 328 and the battery 325. The antenna 327 may include a near field communication (NFC) antenna, a wireless charging antenna and/or a magnetic secure transmission (MST) antenna, for example. The antenna 327 may perform short-distance communication with an external device or may wirelessly transmit and receive power necessary for charging, for example. In an embodiment, an antenna structure may be formed by a part of the side surface bezel structure 321 and/or the first support member 3211 or a combination of them.

The electronic device 300 according to various embodiments of the disclosure may include an electronic device, such as a bar type, a foldable type, a rollable type, a sliding type, a wearable type, a tablet PC and/or a notebook PC. The electronic device 300 according to various embodiments of the disclosure is not limited to the aforementioned example, and may include various other electronic devices.

Figure 4A:
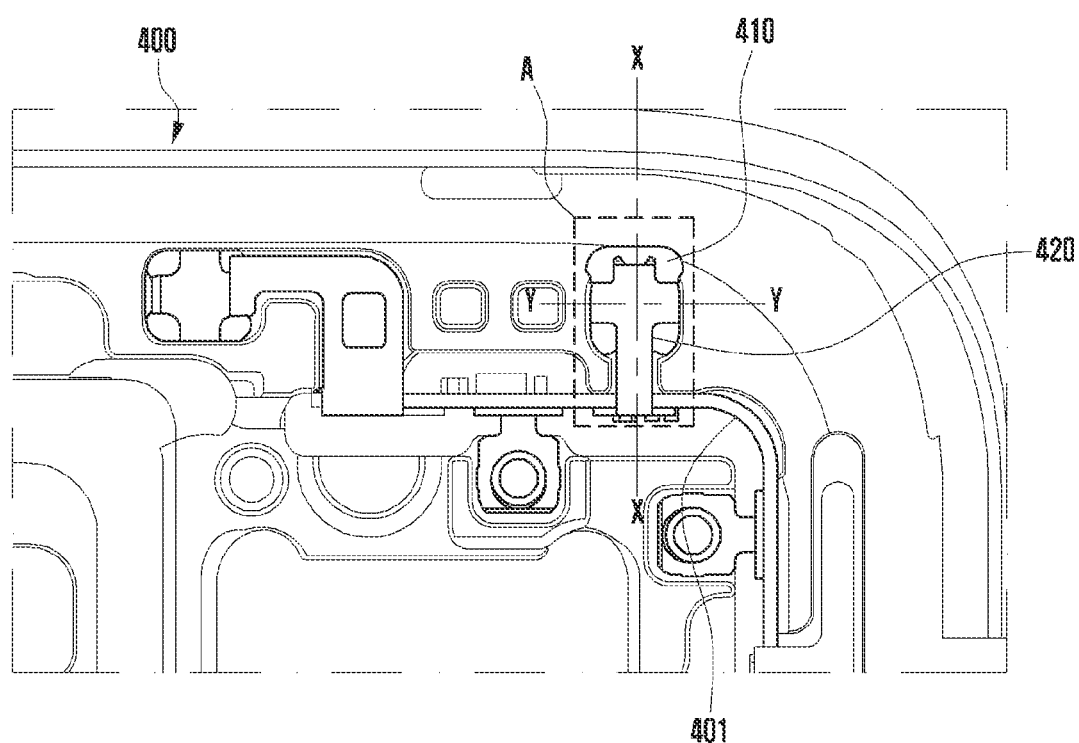
FIG. 4A is a diagram illustrating a cable coupling part and a connector part formed in an antenna of the electronic device according to various embodiments.

FIG. 4A is a diagram illustrating a cable coupling part 410 and a connector part 420 formed in an antenna of the electronic device according to various embodiments.

Figure 4B:
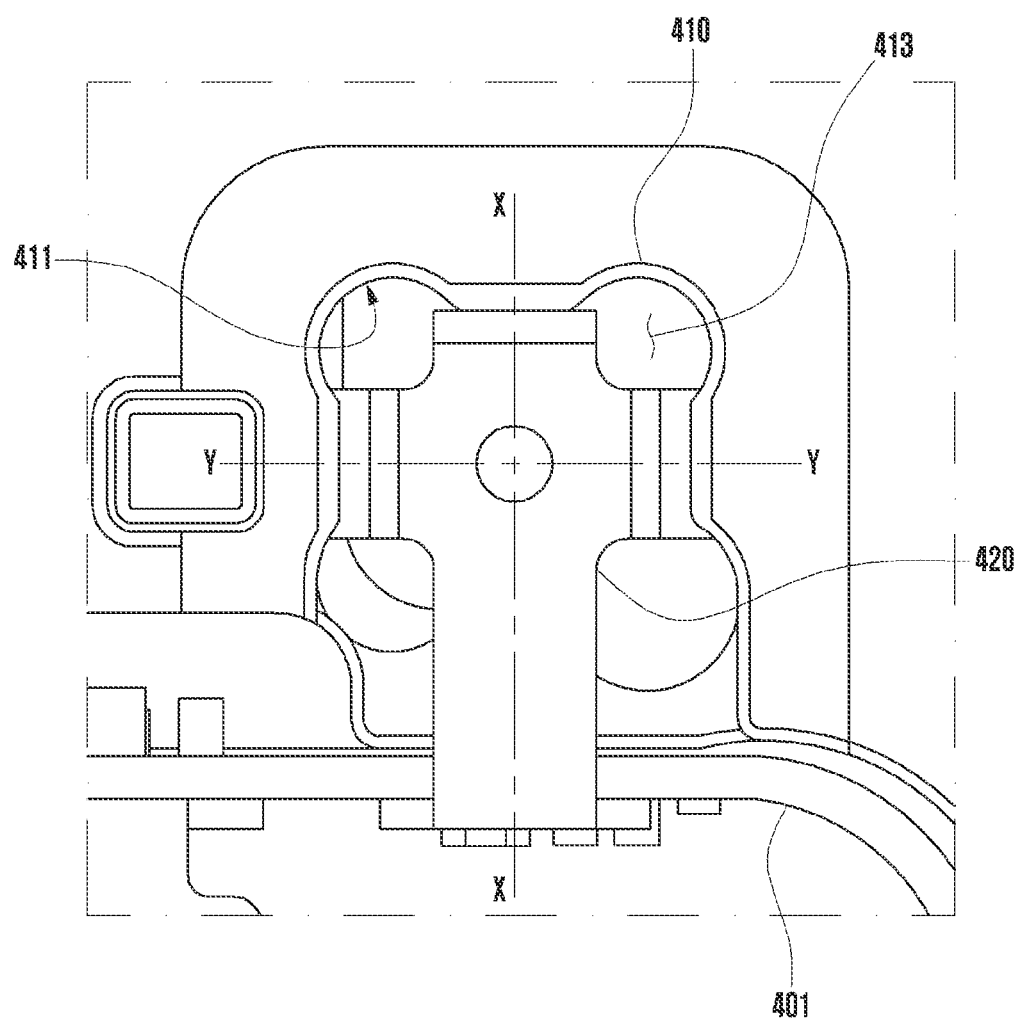
FIG. 4B is diagram illustrating an enlarged view of the cable coupling part and connector part of the electronic device according to various embodiments.

FIG. 4B is a diagram illustrating an enlarged view of the cable coupling part 410 and connector part 420 of the electronic device according to various embodiments.

Figure 4C:
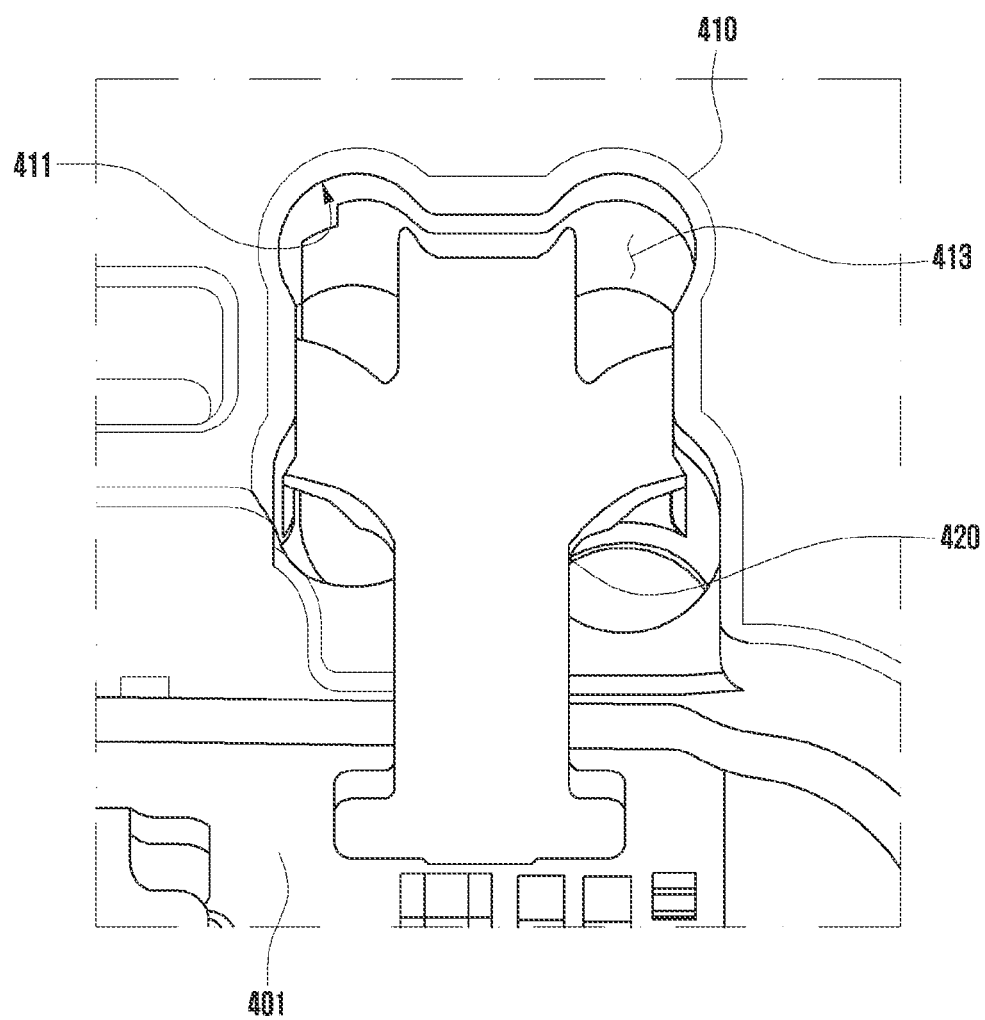
FIG. 4C is a perspective view illustrating the state in which the connector part is combined with the cable coupling part according to various embodiments.

FIG. 4C is a perspective view illustrating the state in which the connector part 420 is combined with the cable coupling part 410 according to various embodiments.

Figure 4D:
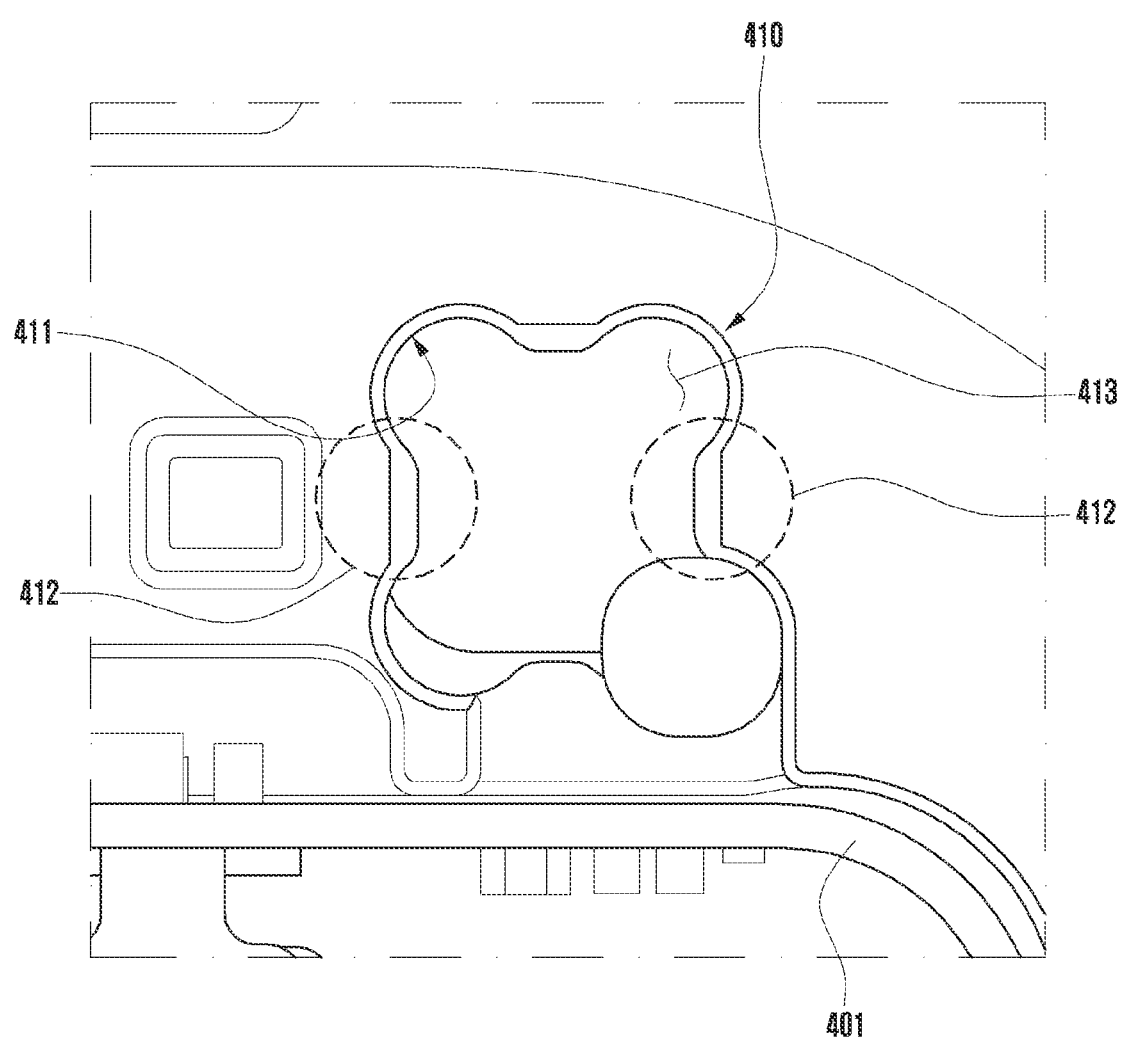
FIG. 4D is a diagram illustrating the cable coupling part of the electronic device according to various embodiments.

FIG. 4D is a diagram illustrating the cable coupling part 410 of the electronic device according to various embodiments.

FIG. 4B is an enlarged view of a portion A in FIG. 4A.

With reference to FIGS. 4A, 4B and 4C, the electronic device may include a cable 401, the cable coupling part 410, and the connector part 420.

The cable 401 may be an electrical connection member which delivers an RF signal between a substrate part (not illustrated) (e.g., the printed circuit board 234 in FIG. 3C) and the cable coupling part 410. In various embodiments, the cable 401 may be a coaxial cable. In an embodiment, the cable 401 may be a flexible flat cable (FFC) or an FPCB RF cable (FRC). The FFC or FRC is provided by forming a conducting wire on a thin flexible polymer substrate by etching or printing, and has an advantage in that an internal space of a portable electronic device whose size is restricted can be reduced.

The connector part 420 may be electrically combined with a part of the cable 401 and inserted into the cable coupling part 410, thus electrically connecting the cable 401 and the cable coupling part 410. The connector part 420 may be snapped and combined with the cable coupling part 410, and may be electrically combined with an internal surface 413 of the cable coupling part 410. The connector part 420 may be a metal material. In various embodiments, the connector part 420 may include a stainless steel (e.g., JIS SUS 304) material. The stainless steel material may have rigidity, elasticity, and corrosion resistance required for the connector part 420. In an embodiment, at least a part of the connector part 420 may be plated with gold, tin, nickel or an alloy including at least one of them. The aforementioned plating can reduce contact resistance of a portion where an electrical contact occurs by suppressing the forming of a surface oxide layer. A detailed description of the connector part 420 is described in greater detail below.

With reference to FIG. 4D, a part of the electronic device, for example, a part of the housing 400 (may be a part, such as the side surface bezel structure 318 in FIG. 3A or the side surface bezel structure 321 in FIG. 3C) may be depressed to form the cable coupling part 410. The cable coupling part 410 may include an opening 411 and an internal space into which the connector part 420 is inserted and the internal surface 413 facing the connector part 420. The housing 400 may protect an internal element of the electronic device in the side surface, and may function as an antenna which transmits and receives radio signals. The housing 400 may include a plastic injection material and a metal material whose shape, location, and combination are selected by taking into consideration the durability, an external appearance, and radio wave radiation performance of the electronic device.

In various embodiments, the cable coupling part 410 may include a trapping jaw 412, for example, a protruded part formed in the circumference of the opening 411. A detailed description of the trapping jaw 412 is described in greater detail below.

Figure 5A:
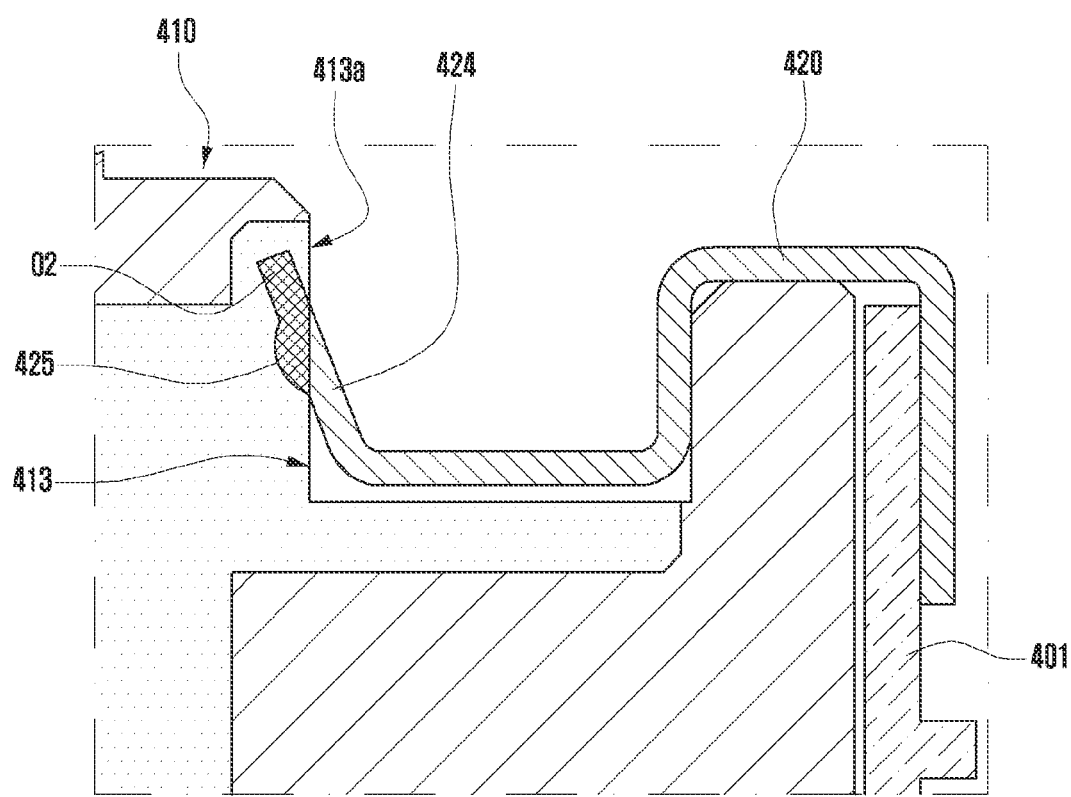
FIG. 5A is a cross-sectional view illustrating the cable coupling part and connector part of the electronic device according to various embodiments.

FIG. 5A is a cross-sectional view illustrating the cable coupling part 410 and connector part 420 of the electronic device according to various embodiments.

Figure 5B:
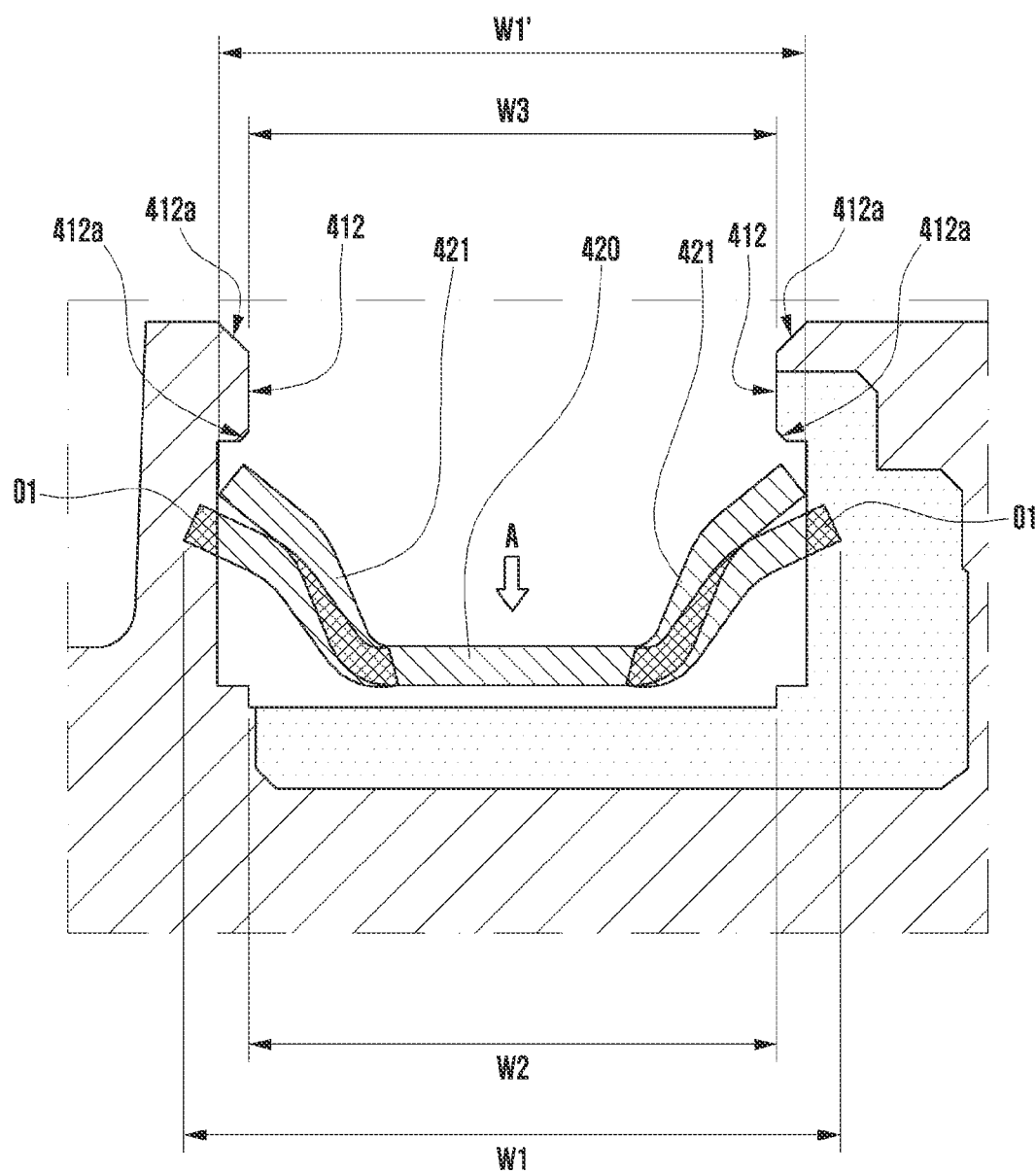
FIG. 5B is a cross-sectional view of the cable coupling part and connector part of the electronic device in a different direction according to various embodiments.

FIG. 5B is a cross-sectional view of the cable coupling part 410 and connector part 420 of the electronic device in a different direction according to various embodiments.

The cross sections of FIGS. 5A and 5B are cutting planes taken in directions X-X and Y-Y, respectively, in FIG. 4A.

With reference to FIGS. 5A and 5B, the connector part 420 may include a hook part 421 and a contact part 424.

The hook part 421 may be a member capable of snapping and combining the connector part 420 with the cable coupling part 410 by being elastically deformed when the connector part 420 is inserted into the cable coupling part 410. The hook part 421 may be a portion which is extended from the connector part 420 and formed by being bent in a direction opposite to a direction (a direction A in FIG. 5B) in which the connector part 420 is inserted into the cable coupling part 410.

In various embodiments, the hook part 421 may have an overlap O1 with the internal surface 413 of the cable coupling part 410. The overlap O1 may refer, for example, to a width W1 of an end part of the hook part 421 being greater than a width W2 between internal surfaces 413 of the cable coupling part which face each other. The overlap may be formed by adjusting an angle at which the hook part 421 is bent when the aforementioned bending processing is performed on the hook part 421. If the angle of the bending is set so that the hook part 421 has a given overlap, the hook part 421 may be elastically deformed in the state in which the connector part 420 has been combined with the cable coupling part 410, and the internal surface 413 may be pressurized by an elastic force. A movement of the connector part 420 within the cable coupling part 410 can be prevented and/or reduced by a friction force generated as the hook part 421 pressurizes the internal surface 413.

In various embodiments, the cable coupling part 410 may include the trapping jaw 412 protruding on an area corresponding to the hook part 421 in the circumference of the opening 411. The trapping jaw 412 may be a portion which elastically deforms the hook part 421 when the connector part 420 is inserted and at which the hook part 421 is trapped when the insertion of the connector part 420 is completed. In various embodiments, a part of or the entire edge of the trapping jaw 412 may be subjected to chamfering 412*a* or rounding processing. As the edge is processed, the hook part 421 can easily pass through the trapping jaw 412. When the hook part 421 passes through the trapping jaw 412, damage to the hook part 421 and the edge of the trapping jaw 412 can be prevented and/or reduced.

When the connector part 420 is inserted into the cable coupling part 410, the trapping jaw 412 may elastically deform the hook part 421. The connector part 420 may pass through the trapping jaw 412 in the state in which the hook part 421 has been elastically deformed. When the insertion of the connector part 420 is completed, the elastic deformation of the hook part 421 may be partially released. A width W1' of the hook part 421 in the state in which the elastic deformation has been partially released is greater than a width W3 between the trapping jaws 412, so that the hook part 421 may be fixed by the trapping jaw 412.

With reference to FIG. 5A again, the cable coupling part 410 may include a conduction part 413*a*. The conduction part 413*a* may be a portion that forms an electrical contact with the connector part 420 as a conductor (e.g., metal) having electrical conductivity is exposed to some area on the internal surface 413 of the cable coupling part 410.

The contact part 424 may be one portion of the connector part 420, which forms an electrical contact with the conduction part 413*a* on the internal surface 413 of the cable coupling part 410. The contact part 424 may be a portion which is extended from the connector part 420 and formed by being bent in the direction opposite to the direction (the direction A in FIG. 5B) in which the connector part 420 is inserted into the cable coupling part 410. In various embodiments, the contact part 424 may have an overlap O2 with the conduction part 413*a* of the cable coupling part 410. The overlap O2 may be formed by setting an angle at which the contact part 424 is bent when the aforementioned bending processing is performed on contact part 424. If the contact part 424 is set to have the given overlap O2, the contact part 424 may be elastically deformed in the state in which the connector part 420 has been combined with the cable coupling part 410, and the contact part 424 may pressurize the conduction part 413*a* by an elastic force. An electrical contact between the contact part 424 and the conduction part 413*a* may be maintained by the pressurization.

The contact part 424 may be extended from the connector part 420 in the state in which the contact part 424 has been separated from the hook part 421. When the connector part 420 is inserted into the cable coupling part 410, the contact part 424 and the hook part 421 may be independently elastically deformed. That is, the contact part 424 may be configured to form an electrical contact with the cable coupling part at least by pressurizing at least a part of the internal surface of the cable coupling part 410 by its elastic force by being elastically deformed in a direction substantially perpendicular relative to the direction of elastic deformation of the hook part 421. As the contact part 424 is separated from the hook part 421 and independently elastically deformed, an electrical contact may be maintained by the elastic force of the contact part 424 regardless of a trapping state of the hook part 421 for the cable coupling part 410. Accordingly, noise and a communication state failure attributable to a change in contact impedance (e.g., contact resistance) between the connector part 420 and the cable coupling part 410 can be prevented and/or reduced.

In various embodiments, the contact part 424 may include a contact tip 425 formed in a portion on a surface of the contact part 424, which faces the internal surface 413 of the cable coupling part 410. In various embodiments, the contact tip 425 may include a curved form protruding on a surface of the contact part 424, for example, a spherical shape. The contact tip 425 having the curved form can stably maintain a contact area with the internal surface 413 of the cable coupling part 410.

In various embodiments, at least a part of a surface of the contact tip 425 may be plated with gold, tin, nickel or an alloy including at least one of them. The plating can maintain contact resistance to be low on the surface of the contact tip 425.

Figure 6A:
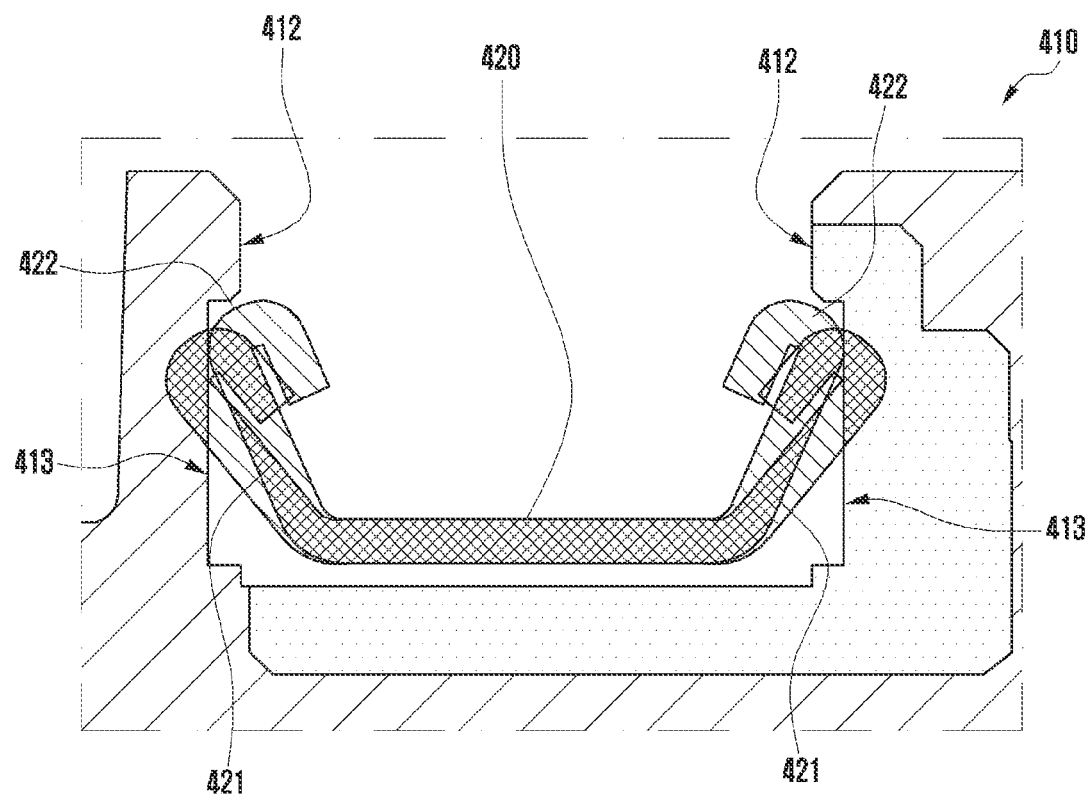
FIG. 6A is a cross-sectional view illustrating a hook part according to various embodiments.

FIG. 6A is a cross-sectional view illustrating the hook part 421 according to various embodiments.

Figure 6B:
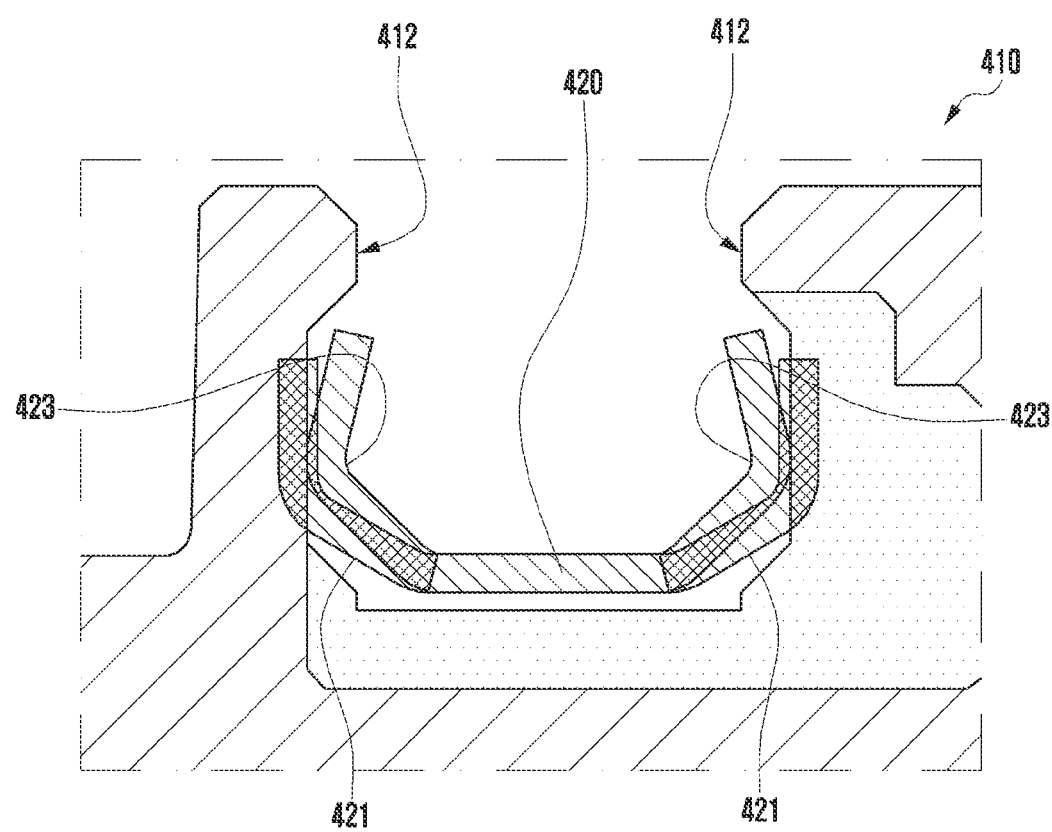
FIG. 6B is a cross-sectional view illustrating the hook part according to various embodiments.

FIG. 6B is a cross-sectional view illustrating the hook part 421 according to various embodiments.

The cross sections of FIGS. 6A and 6B may be cutting planes in the same direction as the direction Y-Y in FIG. 4A.

With reference to FIG. 6A, in various embodiments, an end part 422 of the hook part 421 may be subjected to hemming processing. Hemming may refer, for example, to the end part 422 of the hook part 421 being processed in a way to be folded by bending. As the end part 422 of the hook part 421 is subjected to hemming processing, the end part 422 of the hook part 421 may be rounded. If the end part 422 of the hook part 421 includes a sharp concave-convex, stress applied by the coupling of the connector part 420 may damage the connector part 420 and the cable coupling part 410. Furthermore, as will be described in greater detail below, upon work such as the repairing of an electronic device, the connector part 420 may more easily pass through the trapping jaw 412. In FIG. 6A, it has been illustrated that the hook part 421 is hemmed so that the end part 422 is folded to the inside of the hook part 421, but this is merely an non-limiting example. The hook part 421 may be hemmed so that the end part 422 is folded to the outside of the hook part 421.

With reference to FIG. 6B, in various embodiments, the hook part 421 may include a dual bending structure. The dual bending structure may be a structure in which a break part 423 of the hook part 421 is bent to the inside of the hook part 421 (may refer, for example, to the break part 423 being bent in the same direction as a direction in which the hook part 421 is bent).

If the hook part 421 includes the dual bending structure, a contact area between the internal surface 413 of the cable coupling part 410 and the hook part 421 may be widened. The wide contact area can prevent and/or reduce damage to the cable coupling part 410 because the hook part 421 can distribute stress, occurring as the hook part 421 pressurizes the internal surface 413 of the cable coupling part 410, to a wide area. Furthermore, as a friction force between the hook part 421 and the internal surface 413 is increased, the connector part 420 can be additionally prevented and/or reduced from moving within the cable coupling part 410.

Figure 7A:
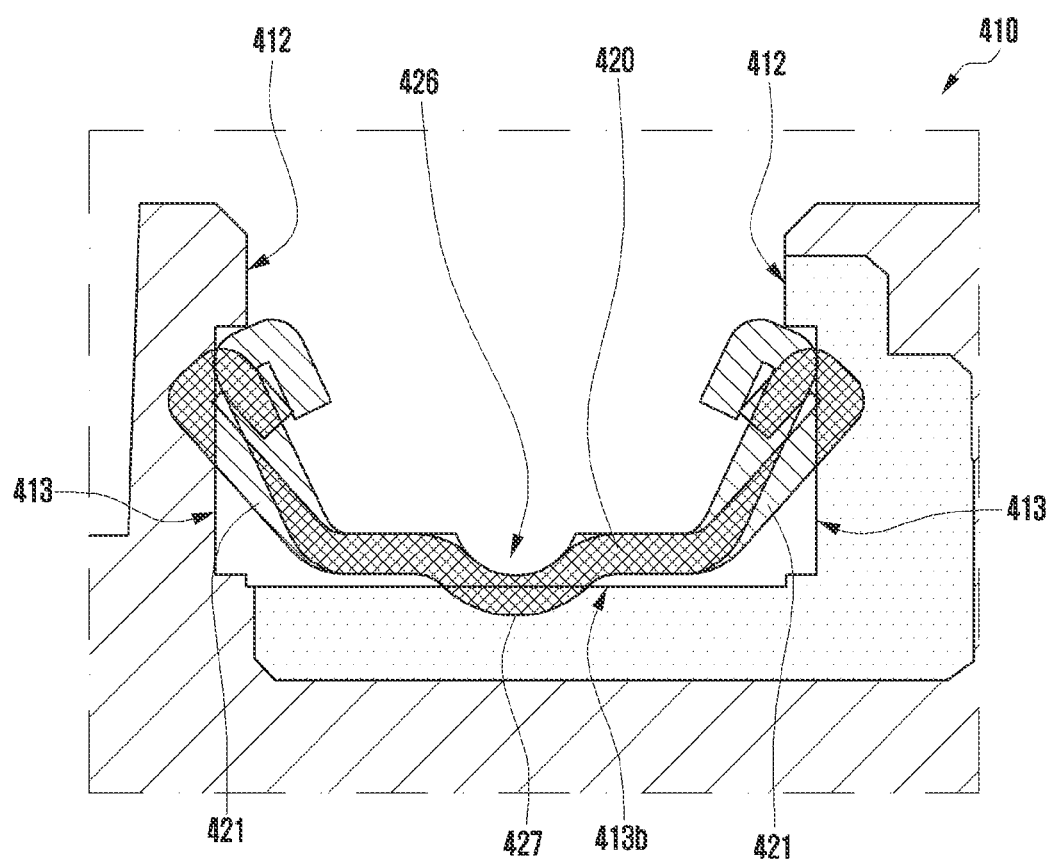
FIG. 7A is a cross-sectional view illustrating a connector part of an electronic device according to various embodiments.

FIG. 7A is a cross-sectional view illustrating the connector part 420 of an electronic device according to various embodiments.

Figure 7B:
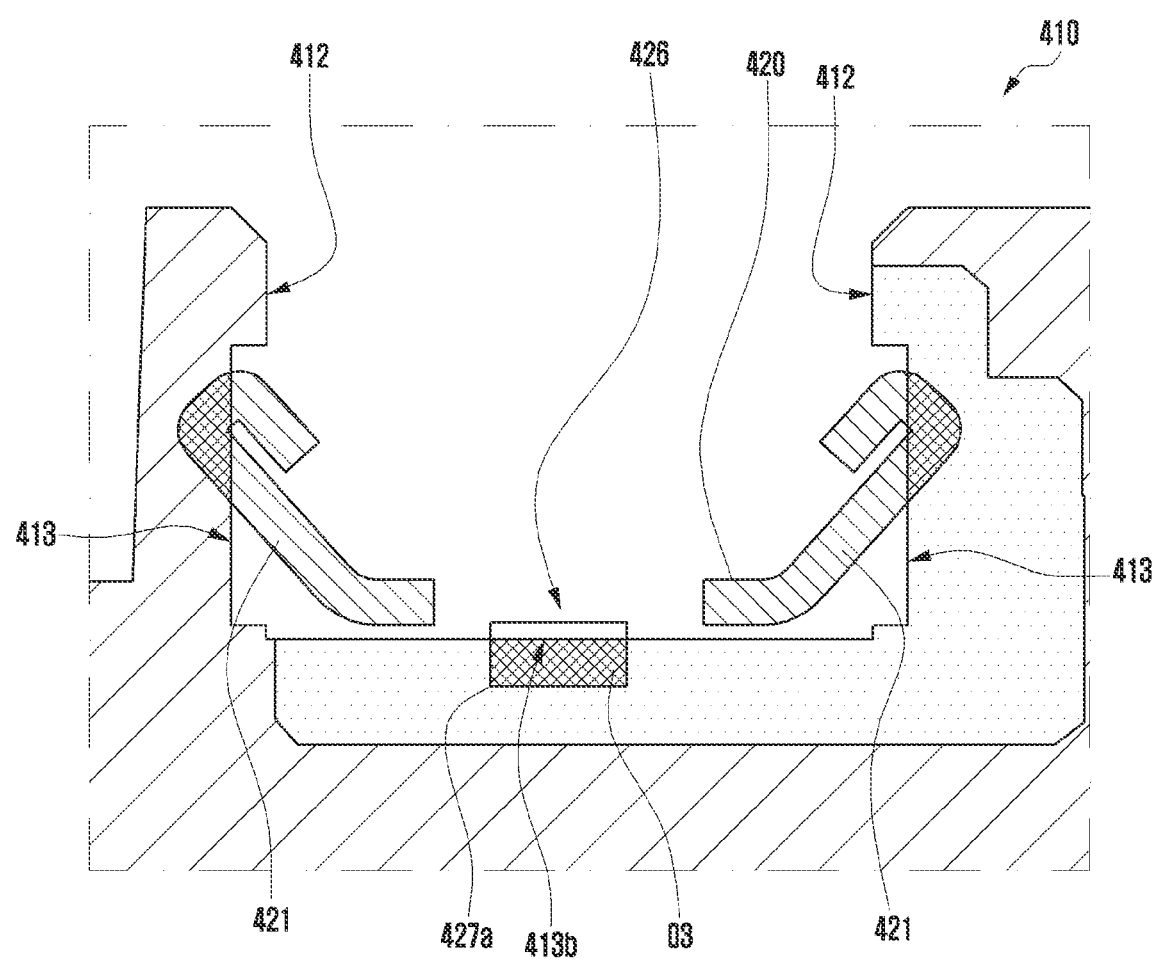
FIG. 7B is a cross-sectional view illustrating the connector part of the electronic device according to various embodiments.

FIG. 7B is a cross-sectional view illustrating the connector part 420 of the electronic device according to various embodiments.

Figure 7C:
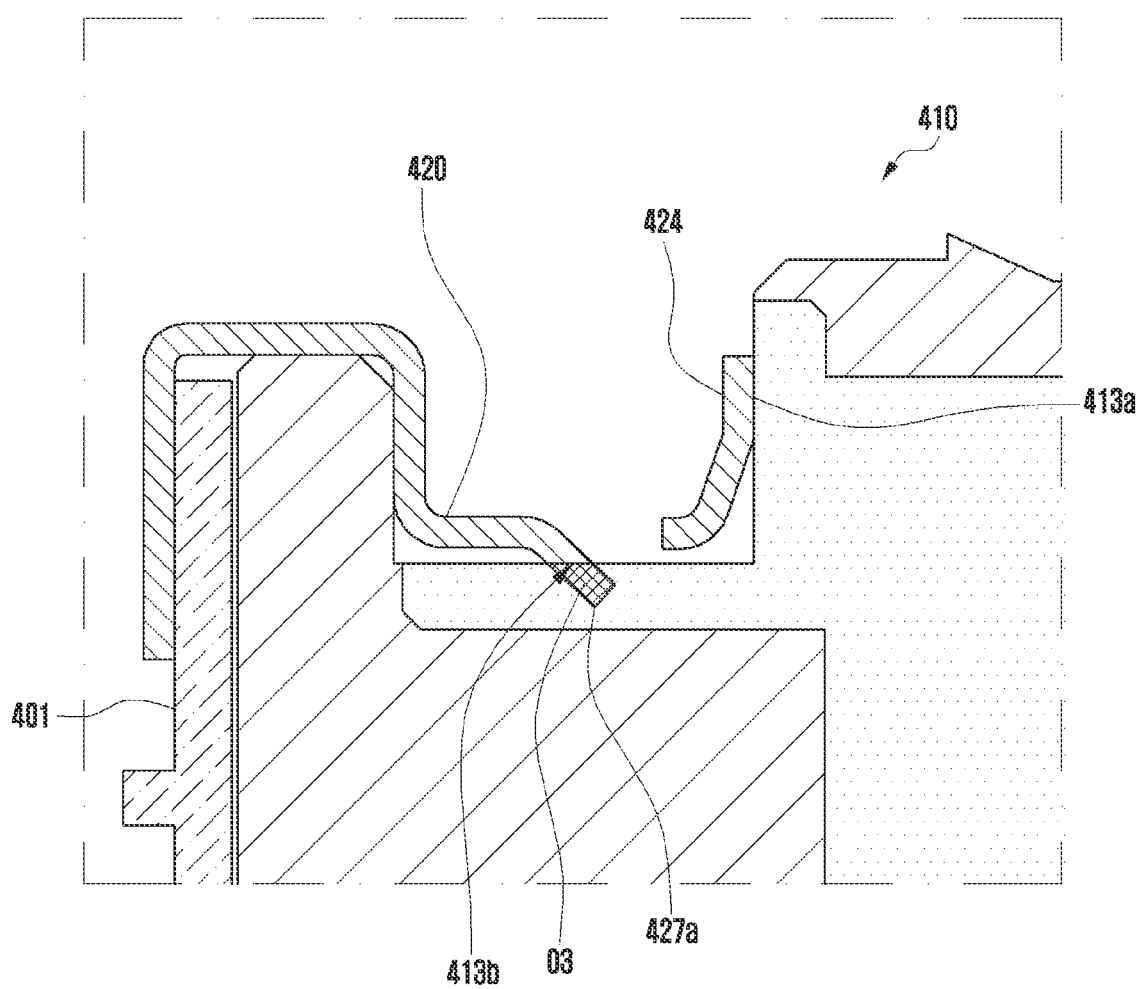
FIG. 7C is a cross-sectional view illustrating the connector part of the electronic device according to various embodiments.

FIG. 7C is a cross-sectional view illustrating the connector part 420 of the electronic device according to various embodiments.

Figure 7D:
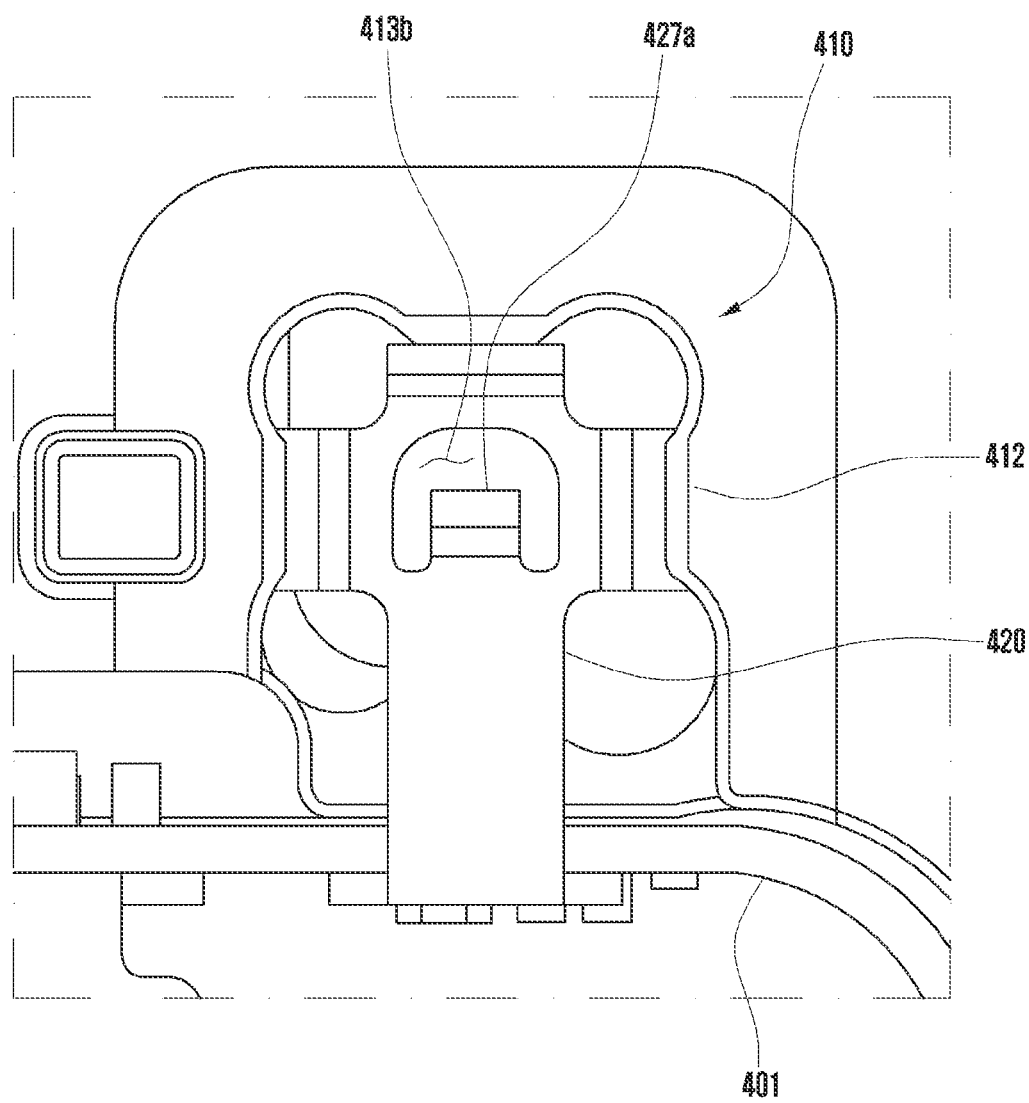
FIG. 7D is a diagram illustrating the connector part of the electronic device according to various embodiments.

FIG. 7D is a diagram illustrating the connector part 420 of the electronic device according to various embodiments.

The cross sections of FIGS. 7A and 7B are cutting planes in the same direction as the direction Y-Y in FIG. 4A.

The cross section of FIG. 7C is a cutting plane in the same direction as the direction X-X in FIG. 4A.

With reference to FIGS. 7A and 7B, the connector part 420 may include an assistant contact part 426. The assistant contact part 426 may be formed in a surface (this may be referred to as a "bottom surface" of the connector part 420) in a direction in which the connector part 420 is inserted. An assistant conduction part 413*b*, for example, a portion through which a conductor is exposed, may be formed on the bottom surface of the cable coupling part 410 facing the assistant contact part 426 so that the assistant conduction part 413*b* electrically comes into contact with the assistant contact part 426. The assistant contact part 426 may form an electric contact to which power to an electrical signal is delivered between the assistant contact part 426 and the assistant conduction part 413b with the help of an electric contact between the contact part 424 and the conduction part 413a. Accordingly, an electrical connection between the connector part 420 and the cable coupling part 410 can be stably maintained.

With reference to FIG. 7A, the assistant conduction part 413b may include an assistant contact tip 427 having a curved form and protruding on the bottom surface of the connector part 420. The assistant contact tip 427 may have a curved form, for example, a spherical shape, and thus may form a given contact area with a surface of the assistant conduction part 413b. In various embodiments, the assistant contact tip 427 may be plated in order to maintain contact resistance to be low.

With reference to FIGS. 7B, 7C, and 7D, the assistant contact part 426 may include an elastic assistant contact tip 427a. The elastic assistant contact tip 427a may be formed by cutting away the bottom surface of the connector part 420 in a U form (or a ⊏ shape) and downward bending the remaining portion after the cutting.

With reference to FIG. 7B, the elastic assistant contact tip 427a may have an overlap O3 with the assistant conduction part 413b and may be elastically deformed while coming into contact with the assistant conduction part 413b when the connector part 420 is combined with the cable coupling part 410. The elastic assistant contact tip 427a can maintain an electrical contact by pressurizing the assistant conduction part 413b by its elastic force.

Figure 8A:
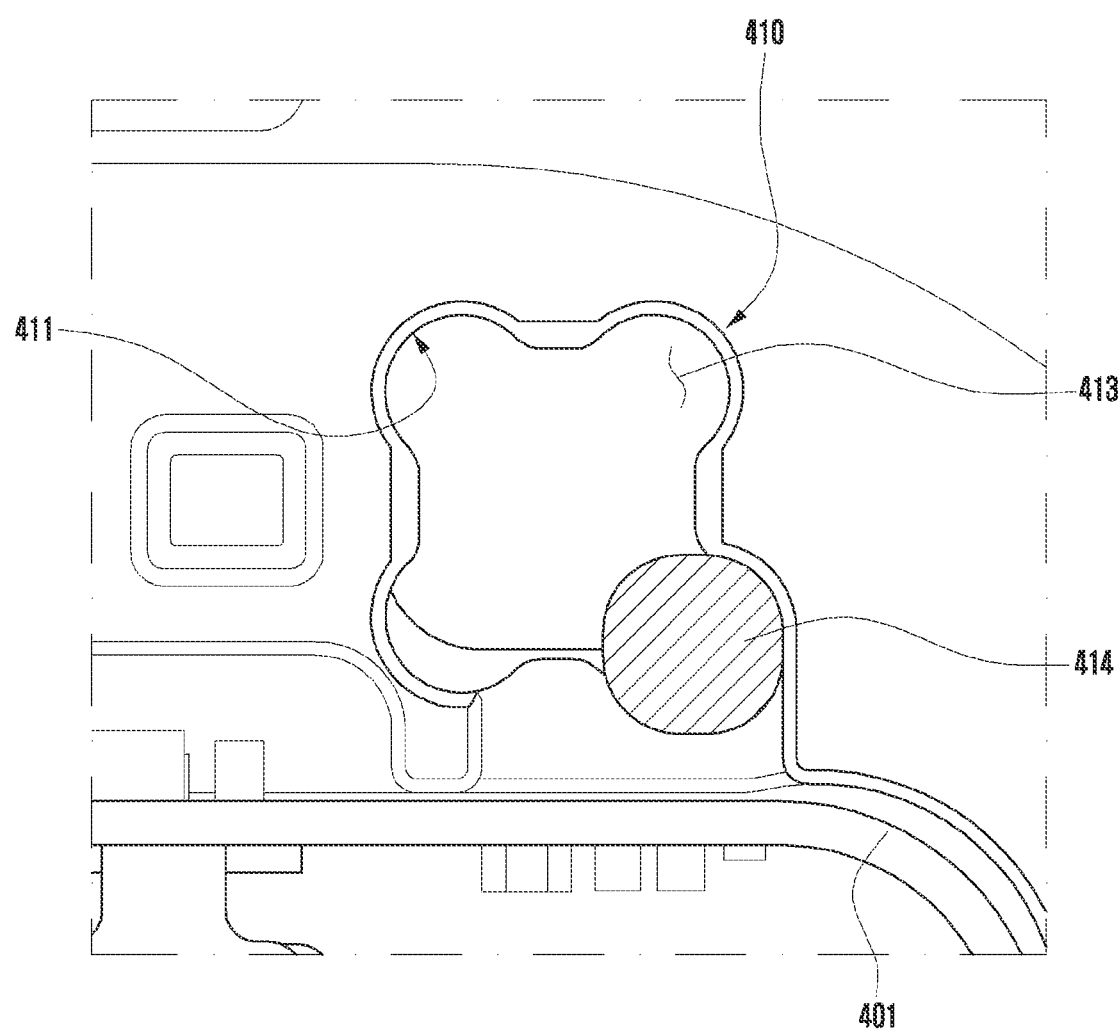
FIG. 8A is a diagram illustrating a cable coupling part of the electronic device according to various embodiments.

FIG. 8A is a diagram illustrating the cable coupling part 410 of the electronic device according to various embodiments.

Figure 8B:
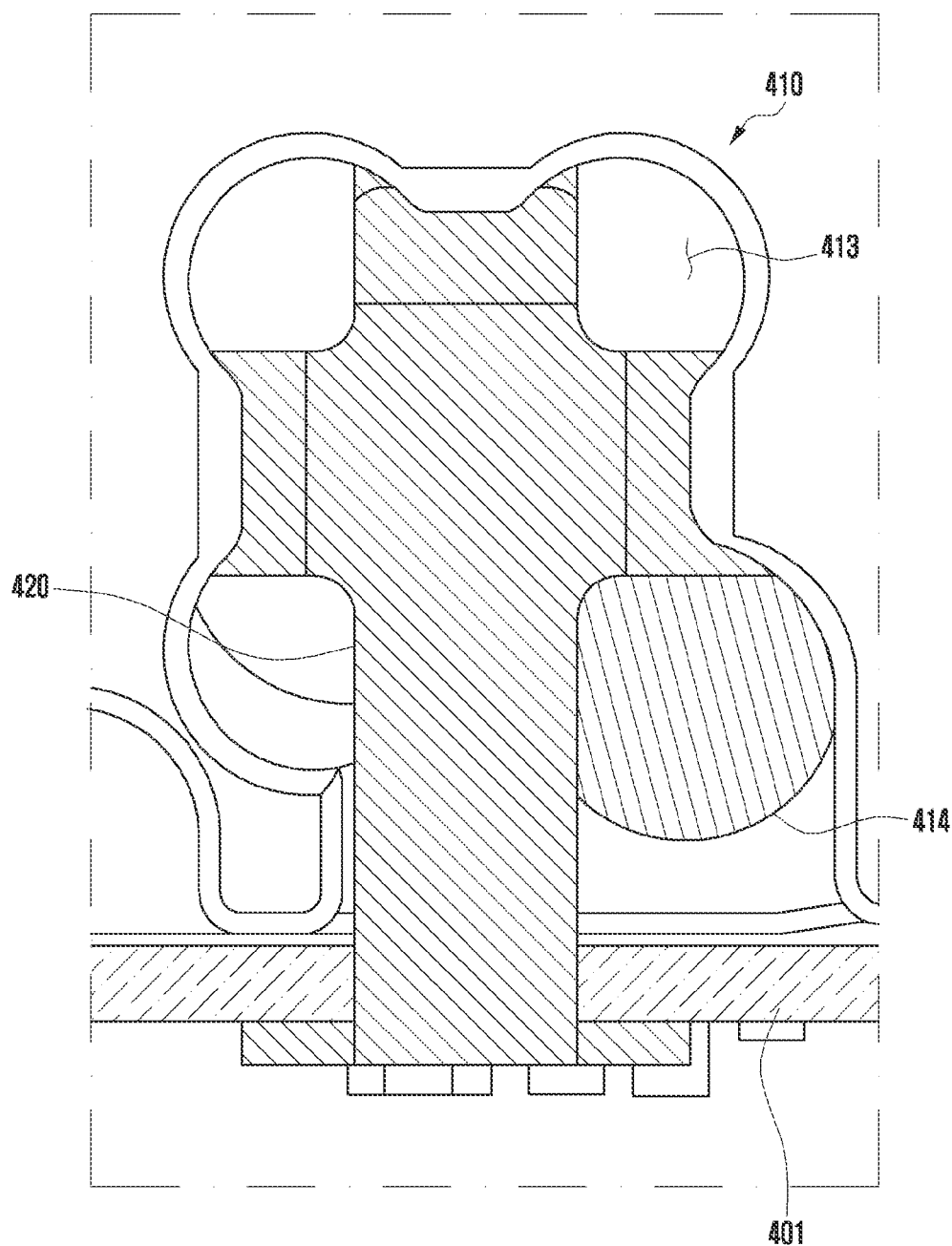
FIG. 8B is a diagram illustrating a cable coupling part and connector part of the electronic device according to various embodiments.

FIG. 8B is a diagram illustrating the cable coupling part 410 and connector part 420 of the electronic device according to various embodiments.

With reference to FIGS. 8A and 8B, the cable coupling part 410 of the electronic device may include a separation groove 414. A surface that belongs to the internal surface 413 of the cable coupling part 410 and that faces the direction in which the connector part 420 is inserted may be defined as a bottom surface. The separation groove 414 may be formed as some area of an edge of the bottom surface is depressed. With reference to FIG. 8B, the separation groove 414 may be disposed to be partially covered by the connector part 420 when the connector part 420 is combined with the cable coupling part 410.

Upon assembly or disassembly of the electronic device, a task for separating the connector part 420 from the cable coupling part 410 may be performed. Upon separation task of the connector part 420, a tool (not illustrated) for a separation task may be inserted through the separation groove 414. A task for inserting and separating the connector part 420 is described in greater detail below.

Figure 9A:
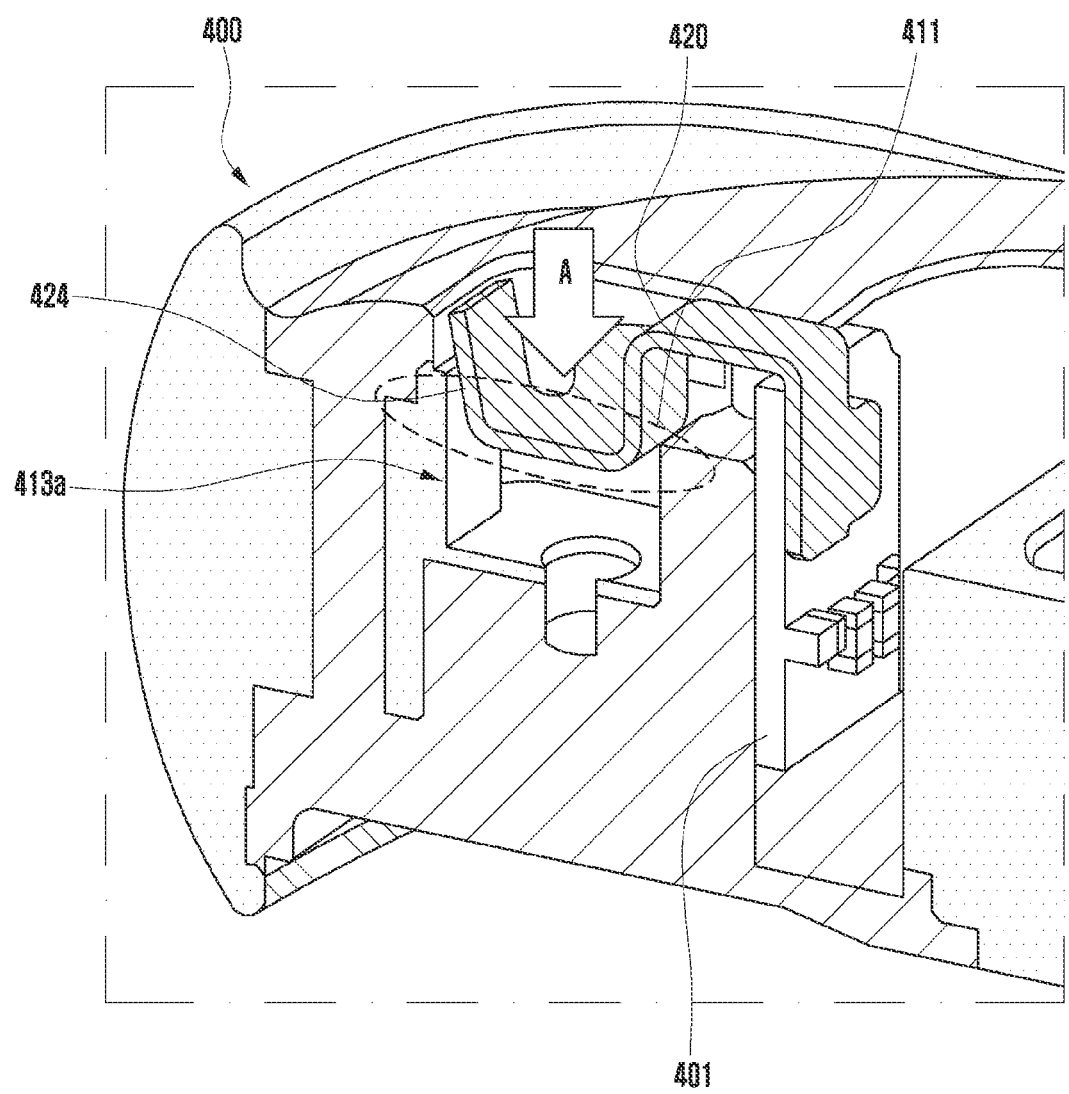
FIG. 9A is a partial perspective view illustrating an action by which the connector part is inserted into the cable coupling part according to various embodiments.

FIG. 9A is a partial perspective view illustrating an action by which the connector part 410 is inserted into the cable coupling part 420 according to various embodiments.

Figure 9B:
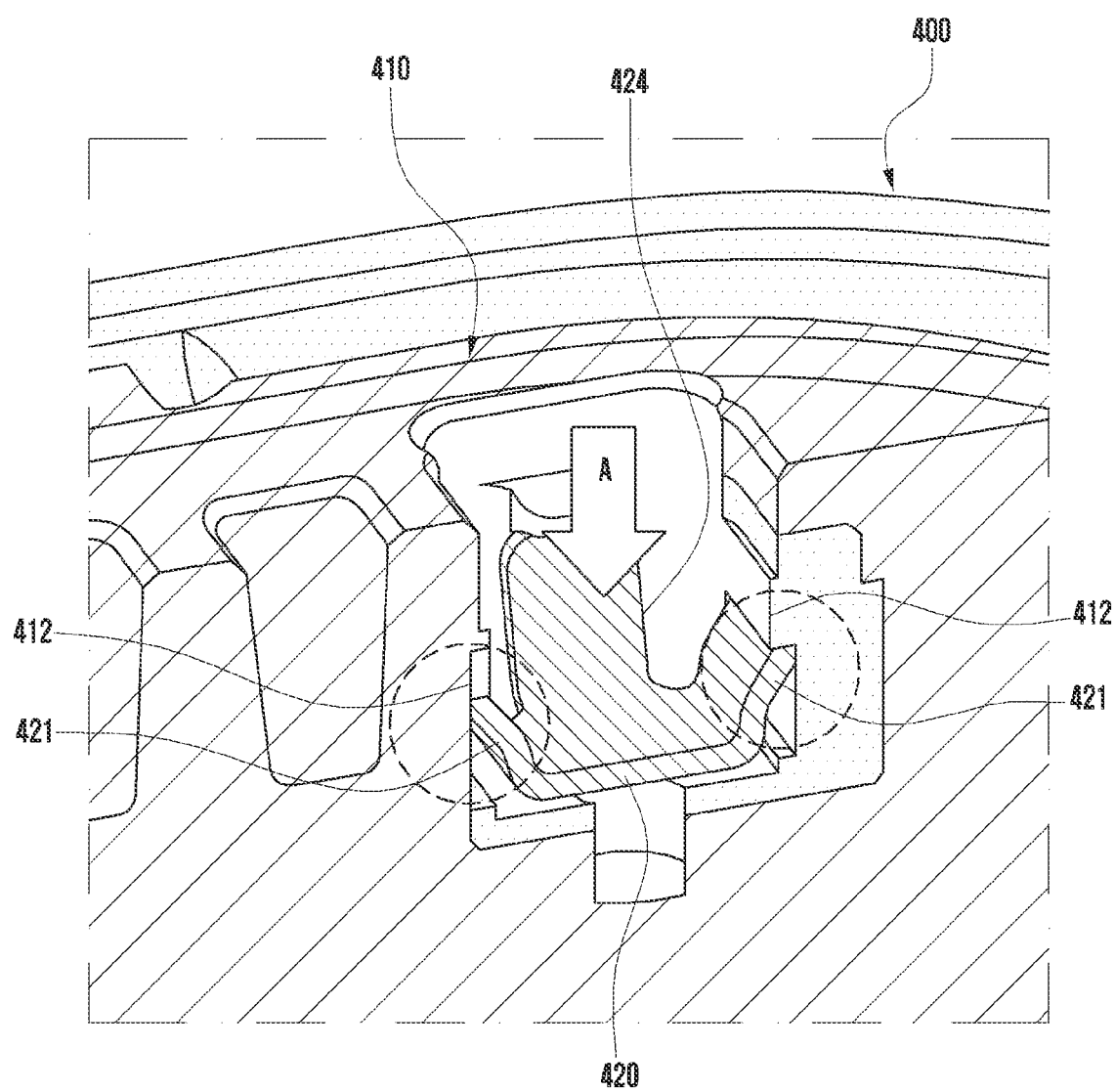
FIG. 9B is a partial perspective view illustrating an action by which the connector part is combined with the cable coupling part according to various embodiments.

FIG. 9B is a partial perspective view illustrating an action by which the connector part 410 is combined with the cable coupling part 420 according to various embodiments.

Figure 9C:
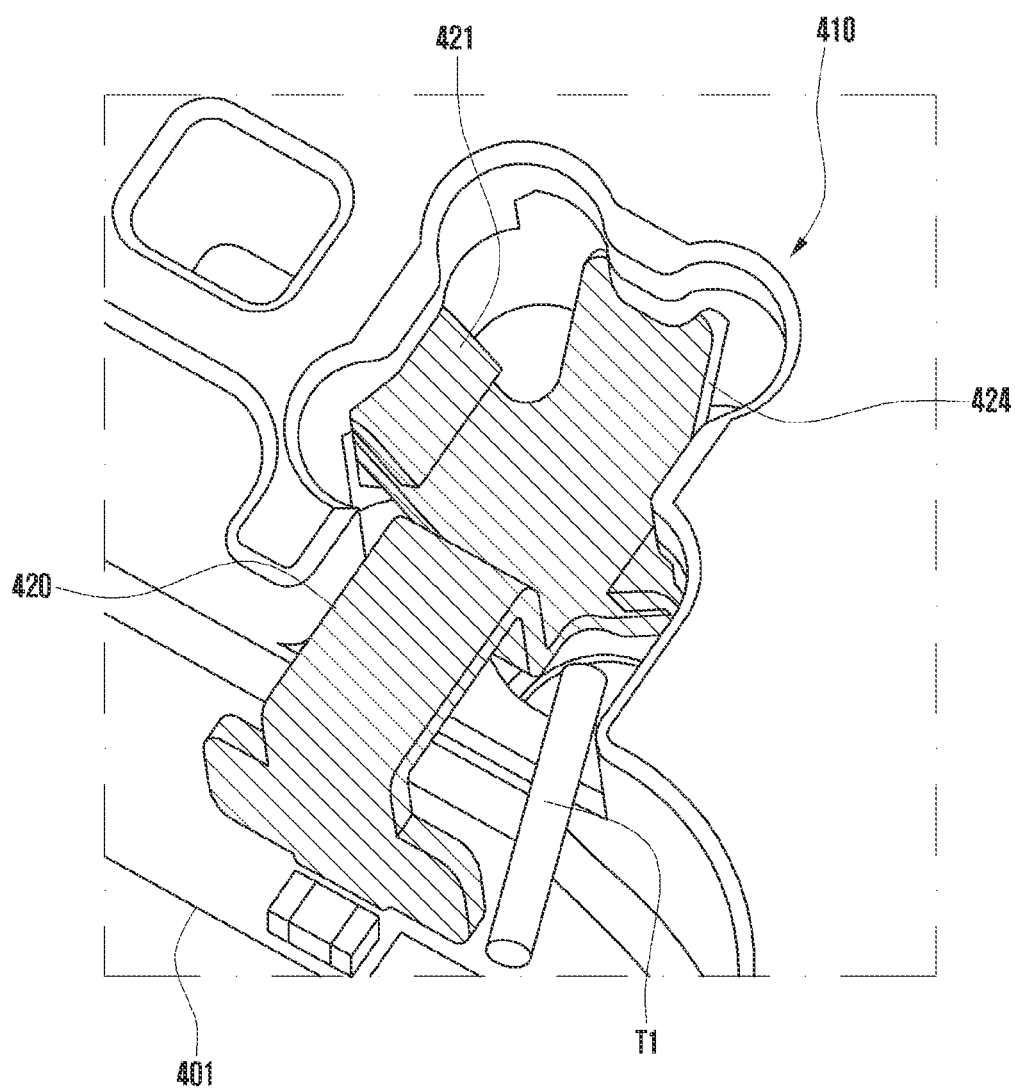
FIG. 9C is a partial perspective view illustrating an action by which the connector part is separated from the cable coupling part according to various embodiments.

FIG. 9C is a partial perspective view illustrating an action by which the connector part 410 is separated from the cable coupling part 420 according to various embodiments.

Figure 9D:
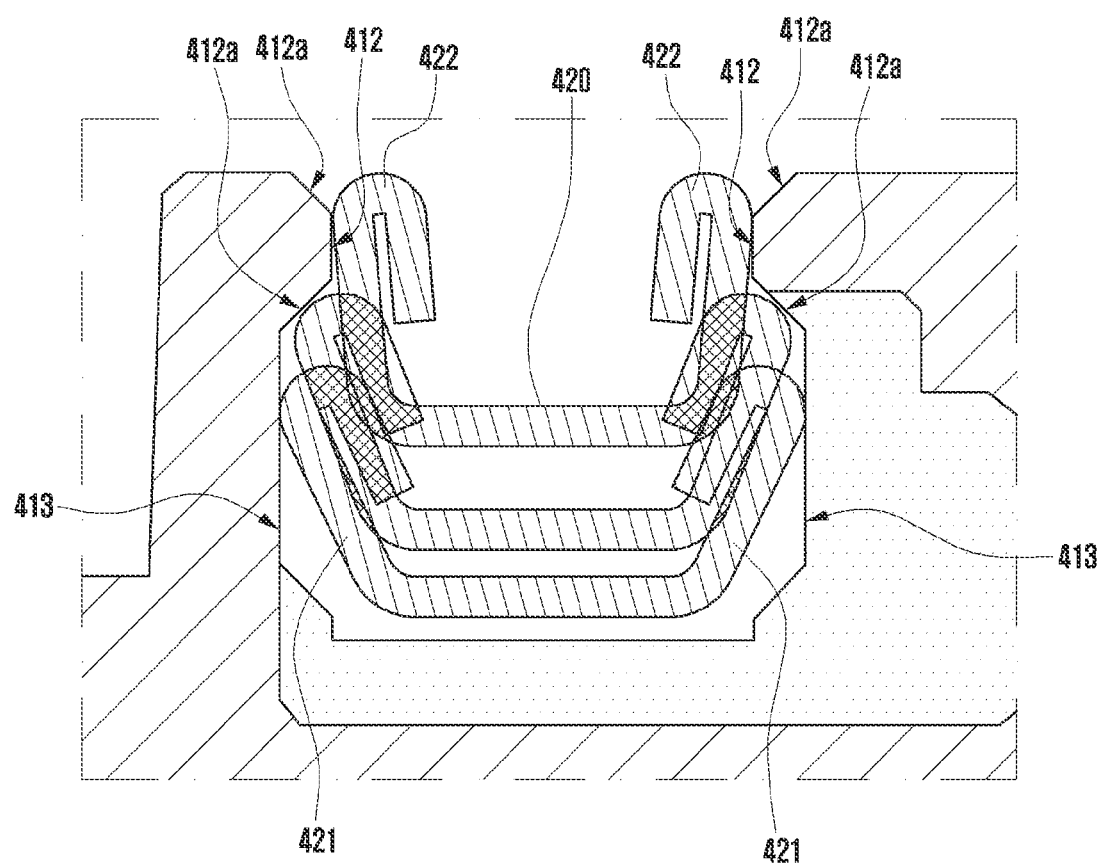
FIG. 9D is a cross-sectional view illustrating an action by which the connector part is separated from the cable coupling part according to various embodiments.

FIG. 9D is a cross-sectional view illustrating an action by which the connector part 410 is separated from the cable coupling part 420 according to various embodiments.

The cross section of FIG. 9A is a cutting plane in the direction X-X in FIG. 4A. The cross sections of FIGS. 9B and 9D are cutting planes in the direction Y-Y in FIG. 4A.

With reference to FIG. 9A, the connector part 420 may be inserted through the opening 411 of the cable coupling part 410. Upon assembly task, the connector part 420 may be inserted manually by a worker or automatically by a tool for assembly. With reference to FIG. 9B, the connector part 420 may be combined with the cable coupling part 410 as the insertion of the connector part 420 into the cable coupling part 410 is completed. When the connector part 420 is completely inserted into the cable coupling part 410, the connector part 420 may be inserted into the cable coupling part 410 as the hook part 421 is trapped at the trapping jaw 412 by its elastic force.

With reference to FIG. 9C, upon task for separating the connector part 420, a tool T1 for separation may be inserted into the separation groove 414. The connector part 420 may be lifted in a direction opposite to a direction (a direction A in FIGS. 9A and 9B) in which the connector part 420 is inserted through a lever action in the state in which a tool T1 for separation has been inserted into the separation groove 414.

With reference to FIG. 9D, when the connector part 420 is lifted from the cable coupling part 410, the hook part 421 may pass through the trapping jaw 412 while being elastically deformed, so that the connector part 420 may be separated from the cable coupling part 410. In various embodiments, the processing of the chamfering 412a for the trapping jaw 412 of the opening 411 and the hemming processing for the end part 422 of the hook part 421 may facilitate that the hook part 421 passes through the trapping jaw 412.

Furthermore, the various example embodiments disclosed in the disclosure and drawings have been presented to provide specific examples in order to easily describe technical contents according to the various embodiments of the disclosure and to aid in understanding of the disclosure, and are intended to be illustrative, not limiting. Accordingly, all changes or modified forms derived based on the technical spirit of various embodiments disclosed in this document should be understood as being included in the scope of various embodiments disclosed in this disclosure in addition to the various example embodiments disclosed herein. It will also be understood that any of the embodiment(s) described herein may be used in conjunction with any other embodiment(s) described herein.

What is claimed is:

1. An electronic device comprising:
   a cable configured to deliver an electrical signal;
   a cable coupling part comprising an opening and an internal surface; and
   a connector part that is configured to electrically connect the cable and the cable coupling part,
   wherein the internal surface of the cable coupling part is configured to receive the connector part, and wherein the cable coupling part is electrically connected to the connector part,
   wherein the connector part comprises:
   a hook part including a hook configured to snap and combine the connector part with the cable coupling part at least by being elastically deformed in a first direction based on the connector part being inserted into the cable coupling part; and
   a contact part comprising a contact separated from the hook part and configured to form an electrical contact with the cable coupling part at least by pressurizing at least a part of the internal surface of the cable coupling part by its elastic force by being elastically deformed in a second direction, substantially perpendicular relative to the first direction, independently of the hook part based on the connector part being combined with the cable coupling part.

2. The electronic device of claim 1, wherein:
the hook part extends from the connector part and is bent and formed in a direction opposite to a direction in which the connector part is combined with the cable coupling part, and
an angle of the bending is set so that the hook part overlaps the internal surface of the cable coupling part, wherein the hook part is configured to elastically pressurize the internal surface of the cable coupling part.

3. The electronic device of claim 2, wherein an end part of the hook part is subjected to hemming processing.

4. The electronic device of claim 2, wherein a break part of the hook part has a dual bending structure bent in a direction identical with the bent direction.

5. The electronic device of claim 1, wherein:
the cable coupling part comprises a conduction part comprising a conductor formed on an area corresponding to the contact part of the internal surface, and
the contact part extending from the connector part and bent and formed in a direction opposite to a direction in which the connector part is inserted into the cable coupling part, and an angle of the bending is set so that the contact part overlaps a surface of the conduction part of the cable coupling part, wherein the contact part is configured to elastically pressurize the internal surface of the cable coupling part.

6. The electronic device of claim 5, wherein the contact part comprises a contact tip having a curved form protruding on a surface facing the conduction part.

7. The electronic device of claim 5, wherein:
the connector part comprises an assistant contact part comprising a contact formed on a surface in the direction in which the connector part is inserted into the cable coupling part, and
the cable coupling part comprises an assistant conduction part comprising a conductor formed in an area on the internal surface corresponding to the assistant contact part.

8. The electronic device of claim 7, wherein the assistant contact part comprises an assistant contact tip having a curved form and protruding on a surface of the connector part facing the assistant conduction part.

9. The electronic device of claim 7, wherein the assistant contact part comprises an elastic assistant contact tip formed to bend, in a direction toward the assistant conduction part, a surface of the connector part facing the assistant conduction part by cutting away or punching the surface of the connector part in a U form.

10. The electronic device of claim 1, wherein the cable coupling part comprises a trapping jaw protruding on an area corresponding to the hook part in a circumference of the opening.

11. The electronic device of claim 10, wherein:
the cable coupling part comprises a bottom surface including an internal surface facing the direction in which the connector part is inserted into the cable coupling part, and
the cable coupling part comprises a separation groove formed as part of an area of an edge of the bottom surface is depressed and disposed to be partially covered by the connector part based on the connector part being combined with the cable coupling part.

12. A cable connector of an electronic device including a cable and a cable coupling part having an internal surface electrically connected to the cable, the cable connector comprising:
a connector part that is configured to electrically connect the cable and the cable coupling part;
a hook part comprising a hook configured to snap and combine the connector part with the cable coupling part at least by elastic deformation in a first direction based on the connector part being inserted into the cable coupling part; and
a contact part comprising a contact separated from the hook part and configured to form an electrical contact with the cable coupling part at least by pressurizing the internal surface of the cable coupling part by elastic force by being elastically deformed in a second direction, substantially perpendicular relative to the first direction, independently of the hook part based on the connector part being combined with the cable coupling part.

13. The cable connector of claim 12, wherein:
the hook part is extended from the connector part and bent and formed in a direction opposite to a direction in which the connector part is combined with the cable coupling part, and
an angle of the bending is set so that the hook part overlaps the internal surface of the cable coupling part, so that the hook part elastically pressurizes the internal surface of the cable coupling part.

14. The cable connector of claim 12, wherein an end part of the hook part is subjected to hemming processing.

15. The cable connector of claim 12, wherein a break part of the hook part has a dual bending structure bent in a direction identical with the bent direction.

16. The cable connector of claim 12, wherein:
the cable coupling part of the electronic device comprises a conduction part comprising a conductor formed on an area corresponding to the contact part of the internal surface, and
the contact part is extended from the connector part and bent and formed in a direction opposite to a direction in which the connector part is inserted into the cable coupling part, and an angle of the bending is set so that the contact part overlaps a surface of the conduction part of the cable coupling part, so that the contact part elastically pressurizes the internal surface of the cable coupling part.

17. The cable connector of claim 16, wherein the contact part comprises a contact tip having a curved form protruding on a surface facing the conduction part.

18. The cable connector of claim 16, wherein:
the connector part comprises an assistant contact part formed on a surface in the direction in which the connector part is inserted into the cable coupling part, and
the cable coupling part comprises an assistant conduction part formed in an area on the internal surface corresponding to the assistant contact part.

19. The cable connector of claim 18, wherein the assistant contact part comprises an assistant contact tip having a curved form and protruding on a surface of the connector part facing the assistant conduction part.

20. The cable connector of claim 18, wherein the assistant contact part comprises an elastic assistant contact tip formed to bend, in a direction toward the assistant conduction part, a surface of the connector part facing the assistant conduction part by cutting away or punching the surface of the connector part in a U form.

* * * * *